US009976027B2

(12) United States Patent
Okamoto

(10) Patent No.: US 9,976,027 B2
(45) Date of Patent: May 22, 2018

(54) POLYMER FINE PARTICLE-CONTAINING CURABLE RESIN COMPOSITION HAVING IMPROVED STORAGE STABILITY

(71) Applicant: KANEKA CORPORATION, Osaka-shi (JP)

(72) Inventor: Toshihiko Okamoto, Takasago (JP)

(73) Assignee: KANEKA CORPORATION, Osaka-shi (JP)

( * ) Notice: Subject to any disclaimer, the term of this patent is extended or adjusted under 35 U.S.C. 154(b) by 89 days.

(21) Appl. No.: 15/033,248

(22) PCT Filed: Oct. 28, 2014

(86) PCT No.: PCT/JP2014/078594
§ 371 (c)(1),
(2) Date: Apr. 29, 2016

(87) PCT Pub. No.: WO2015/064561
PCT Pub. Date: May 7, 2015

(65) Prior Publication Data
US 2016/0244603 A1 Aug. 25, 2016

(30) Foreign Application Priority Data

Oct. 29, 2013 (JP) ................................. 2013-223833
Aug. 22, 2014 (JP) ................................. 2014-169859

(51) Int. Cl.
| | |
|---|---|
| C08L 83/00 | (2006.01) |
| C08L 63/00 | (2006.01) |
| C08G 59/06 | (2006.01) |
| C08G 59/14 | (2006.01) |
| C09J 11/04 | (2006.01) |
| C09J 11/08 | (2006.01) |
| C09J 163/00 | (2006.01) |
| C08L 51/04 | (2006.01) |

(52) U.S. Cl.
CPC ............ *C08L 63/00* (2013.01); *C08G 59/063* (2013.01); *C08G 59/14* (2013.01); *C08G 59/1477* (2013.01); *C09J 11/04* (2013.01); *C09J 11/08* (2013.01); *C09J 163/00* (2013.01); *C08L 51/04* (2013.01)

(58) Field of Classification Search
CPC ........ C08L 63/00; C08G 59/063; C08G 59/14
See application file for complete search history.

(56) References Cited

U.S. PATENT DOCUMENTS

| | | | |
|---|---|---|---|
| 6,776,869 B1 | 8/2004 | Schenkel | |
| 8,729,197 B2 * | 5/2014 | Kropp | .................. C08G 18/003 |
| | | | 141/285 |
| 2008/0029200 A1 | 2/2008 | Sheasley | |
| 2008/0188609 A1 | 8/2008 | Agarwal et al. | |
| 2008/0251202 A1 | 10/2008 | Eagle et al. | |
| 2008/0308212 A1 | 12/2008 | Sheasley et al. | |
| 2010/0036022 A1 | 2/2010 | Sato et al. | |
| 2010/0204404 A1 | 8/2010 | Hongo | |
| 2012/0103517 A1 | 5/2012 | Eagle et al. | |
| 2013/0137796 A1 | 5/2013 | Kropp | |
| 2016/0122539 A1 * | 5/2016 | Okamoto | ................... C08J 5/04 |
| | | | 428/319.7 |

FOREIGN PATENT DOCUMENTS

| | | |
|---|---|---|
| JP | 2005-255822 A | 9/2005 |
| JP | 2009-506169 A | 2/2009 |
| JP | 2010-77305 A | 4/2010 |
| JP | 2010-523800 A | 7/2010 |
| JP | 2010-270204 A | 12/2010 |
| JP | 2013/95786 A | 5/2013 |
| JP | 2013-535561 A | 9/2013 |
| WO | WO 00/37554 A1 | 6/2000 |
| WO | WO 2007/025007 A1 | 3/2007 |
| WO | WO 2008/014053 A2 | 1/2008 |
| WO | WO 2008/127923 A2 | 10/2008 |
| WO | WO 2008/157129 A1 | 12/2008 |
| WO | WO 2009/034966 A1 | 3/2009 |
| WO | WO 2012/033164 A1 | 3/2012 |

OTHER PUBLICATIONS

Machine Translation of JP 2005-2555822 (2005).*
International Search Report dated Feb. 3, 2015, in PCT/JP2014/078594, filed Oct. 28, 2014.
Extended European Search Report dated Jul. 14, 2017 in Patent Application No. 14857842.0.

* cited by examiner

*Primary Examiner* — Hannah J Pak
(74) *Attorney, Agent, or Firm* — Oblon, McClelland, Maier & Neustadt, L.L.P.

(57) ABSTRACT

A curable resin composition of the present invention contains 1 to 100 parts by mass of a polymer fine particle (B) relative to 100 parts by mass of an epoxy resin (A), wherein the polymer fine particle has a core-shell structure, the core layer of the polymer fine particle is diene rubber, the content of the epoxy group of the polymer fine particle (B) is 0.01 to 0.2 mmol/g. A curable resin composition (I) of the first embodiment contains 0.5 to 30 parts by mass of fumed silica as an inorganic filler (C). In addition, a curable resin composition (II) of the second embodiment contains bisphenol A epoxy resin and rubber-modified epoxy resin and/or urethane-modified epoxy resin as the epoxy resin (A).

20 Claims, No Drawings

US 9,976,027 B2

POLYMER FINE PARTICLE-CONTAINING CURABLE RESIN COMPOSITION HAVING IMPROVED STORAGE STABILITY

TECHNICAL FIELD

The present invention relates to a curable resin composition containing an epoxy resin as a main component having excellent storage stability and impact resistance.

BACKGROUND ART

The cured product from the epoxy resin has many merits such as excellent dimensional stability, mechanical strength, electrical insulation, heat resistance, water resistance, chemical resistance and the like. However, the cured product obtained from the epoxy resin shows very brittle property due to small fracture toughness, so that this property has the influence on the applications of the wide range in some cases.

Patent Document 1 discloses a technology of improving the toughness and the impact resistance of the cured product obtained by dispersing polymer fine particles in the curable resin composition containing a curable resin such as an epoxy resin as main component.

Patent Document 2 discloses a technology for applying the epoxy resin having the toughness and the impact resistance to adhesive and the like. Various inorganic fillers are added to the epoxy resin for the purpose of the improving the workability such as dripping prevention or the purpose of controlling the physical properties of the cured product obtained.

Adhesive using the epoxy resin composition having the toughness and the impact resistance has been used in a structural adhesive for vehicle, and the strength of impact and peel-resistant adhesion to described in ISO 11343 has been regarded as important.

Patent Document 3 discloses a curable resin composition containing a curable resin and a graft copolymer obtained by copolymerizing a vinyl monomer having a glycidyl group and a crosslinking monomer. Patent Document 3 also discloses that the increase of the viscosity is prevented in the composition at with time, and the cured product has excellent impact resistance and adhesive strength. Patent Document 3 further discloses that the viscosity of the composition is increased by swelling of the graft part with the due to high affinity of the graft part with the matrix resin as a mechanism of increasing the viscosity of the composition after storage, and discloses a technology of improving the increase of the viscosity of the composition after storage by copolymerizing a crosslinking monomer with a graft part. However, in Patent Document 3, there is no suggestion that the viscosity of the composition is increased by the combination with given inorganic fillers. In addition, in Patent Document 3, there is no disclosure of the relation of the vinyl monomer having a glycidyl group on the graft part and the rate of increasing the viscosity of the composition. In addition, as indicated in Example of Patent Document 3, the impact resistance (sharpy impact strength) of the cured product is not necessarily improved compared with the impact strength of Comparative Example. Further, there is no descriptions of adhesive strength to impact and peel in Patent Document 3. Here, there is no correlation between dynamic peel strength such as adhesive strength to impact and peel and static peel strength such as T peel strength.

PRIOR ART DOCUMENTS

Patent Document

Patent Document 1: WO2009/034966
Patent Document 2: WO2008/127923
Patent Document 3: JP2013-095786
Patent Document 4: WO2000/037554
Patent Document 5: WO2007/025007
Patent Document 6: WO2008/014053
Patent Document 7: WO2008/157129
Patent Document 8: JP2010-077305
Patent Document 9: JP2013-535561

SUMMARY OF THE INVENTION

Problems to be Solved by the Invention

As mentioned above, Patent Document 3 discloses that the viscosity of the composition is increased by swelling the graft part of the polymer fine particles in the matrix resin such as the epoxy resin, and the core layer of the graft copolymer contains as a main component (meth)acrylate monomer having high affinity with the epoxy resin in Example of Patent Document 3, so that the swelling of the core layer in the matrix resin seemingly contributes to the increase of the viscosity with time. When the graft copolymer having the core-shell structure and diene rubber as the core layer is used, we confirmed that there was no problem of the increase of the viscosity with time as indicated in Patent Document 3. Further, we confirmed that the cured product of the following epoxy based curable resin composition showed very lower impact and peel-resistant adhesion in the epoxy based curable resin composition containing the graft copolymer having as the core layer silicone rubber or acrylic rubber used in Example of Patent Document 3.

However, we confirmed that there is a problem that the viscosity of the composition is increased after storage in the epoxy resin composition containing fumed silica and polymer fine particles of the graft copolymer containing an epoxy group in a given amount and having diene rubber as the core layer. This problem of storage stability is not observed in a composition without containing fumed silica, and the increase of the viscosity after storage is not found even when inorganic fillers except fumed silica such as crystal silica and fused silica described in Patent Document 3 is added to the composition.

Generally, the structure adhesive for vehicle has been used as one pack composition in some cases, and the compatibility of the impact and peel-resistant adhesion and the storage stability is a very important problem.

On the other hand, Patent Documents 4 to 9 disclose technologies of improving the adhesiveness and the impact resistance using the epoxy resin composition containing a modifier obtained by the reaction of an elastomer and an epoxy group-containing compound such as rubber-modified epoxy resin and urethane-modified epoxy resin. However, the curable resin compositions containing the modifier described in Patent Documents 4 to 9 and polymer fine particles have poor storage stability and insufficient impact and peel-resistant adhesion in some cases, and the compatibility of the impact and peel-resistant adhesion and the storage stability is a very important problem.

The object of the present invention is to provide a curable resin composition containing an epoxy resin as a main component having excellent thixotropy and storage stability, and further having excellent T peel adhesion and impact and peel-resistant adhesion of the cured product obtained.

Solution to the Problems

The present inventors have found that the viscosity of the composition is increased after storage in the case where the curable resin composition containing an epoxy resin (A), and a polymer fine particle (B) having the core-shell structure and diene rubber as the core layer further contains fumed silica as an inorganic filler (C), or in the case where the curable resin composition contains as the epoxy resin (A) bisphenol A epoxy resin and rubber-modified epoxy resin and/or urethane-modified epoxy resin, and further has found that the problem is solved by limiting the content of the epoxy group of the polymer fine particle (B) to 0.01 to 0.2 mmol/g, to complete the present invention.

Specifically, the present invention relates to a curable resin composition (I) comprising 1 to 100 parts by mass of a polymer fine particle (B), 0.5 to 30 parts by mass of an inorganic filler (C) relative to 100 parts by mass of an epoxy resin (A), wherein the polymer fine particle has a core-shell structure, the core layer of the polymer fine particle is diene rubber, the content of the epoxy group of the polymer fine particle (B) is 0.01 to 0.2 mmol/g, and the inorganic filler (C) is fumed silica.

The present invention also relates to a curable resin composition (II) comprising 1 to 100 parts by mass of a polymer fine particle (B) relative to 100 parts by mass of an epoxy resin (A), wherein the polymer fine particle has a core-shell structure, the core layer of the polymer fine particle is diene rubber, the content of the epoxy group of the polymer fine particle (B) is 0.01 to 0.2 mmol/g, the epoxy resin (A) comprises bisphenol A epoxy resin, and rubber-modified epoxy resin and/or urethane-modified epoxy resin.

The curable resin composition (II) of the present invention preferably further comprises 0.5 to 30 parts by mass of fumed silica as the inorganic filler (C) relative to 100 parts by mass of the epoxy resin (A).

The curable resin composition of the present invention preferably is one-pack curable resin composition.

The curable resin composition preferably further comprises 1 to 80 parts by mass of an epoxy curing agent (D) relative to 100 parts by mass of the epoxy resin (A). The curable resin composition preferably further comprises 0.1 to 10 parts by mass of a curing accelerator (E) relative to 100 parts by mass of the epoxy resin (A). The curable resin composition preferably further comprises 0.1 to 10 parts by mass of calcium oxide (F) relative to 100 parts by mass of the epoxy resin (A).

The diene rubber is preferably butadiene rubber and/or butadiene-styrene rubber. The polymer fine particle (B) preferably has the shell layer graft-polymerized on the core layer, and the shell layer is polymerized with one or more monomers selected from the group consisting of an aromatic vinyl monomer, a vinyl cyanide monomer, and a (meth) acrylate monomer. The polymer fine particle (B) preferably has the shell layer graft-polymerized on the core layer, and the shell layer is polymerized with at least a monomer having an epoxy group. The monomer having an epoxy group is preferably glycidyl methacrylate. The polymer fine particle (B) is preferably dispersed at the state of primary particle in the curable resin composition. The rubber-modified epoxy resin is preferably acrylonitrile-butadiene-modified epoxy resin.

The curable resin composition is preferably applied to a cured product of the curable resin composition, or a structural adhesive using the curable resin composition, and more preferably a structural adhesive for vehicle using the curable resin composition.

Effects of the Invention

The curable resin composition of the present invention has excellent thixotropy and storage stability, and can improve T peel adhesion, impact and peel-resistant adhesion of the cured product obtained.

MODE FOR CARRYING OUT THE INVENTION

The curable resin composition of the present invention is explained more detail.

The curable resin composition of the present invention contains 100 parts by mass of the epoxy resin (A), and 1 to 100 parts by mass of polymer fine particle(s) (B), wherein the polymer fine particles (B) have a core-shell structure, the core layer of the polymer fine particles are diene rubber, and the content of the epoxy group of the polymer fine particles is 0.01 to 0.2 mmol/g. The curable resin composition of the present invention is preferably divided into any of the first embodiment and the second embodiment.

The first embodiment of the present invention is the curable resin composition (I) containing 0.5 to 30 parts by mass of fumed silica as the inorganic filler relative to 100 parts by mass of the epoxy resin (A).

The second embodiment of the present invention is the curable resin composition (II) containing as the epoxy resin (A) bisphenol A epoxy resin and rubber-modified epoxy resin and/or urethane modified epoxy resin. The first embodiment of the present invention has the advantage on high thixotropy, and the second embodiment of the present invention has the advantage on excellent adhesiveness.

<Epoxy Resin (A)>

The epoxy resin is used as the major component of the curable resin composition of the present invention.

In the curable resin composition (I) of the first embodiment of the present invention, the epoxy resin is not particularly limited and examples thereof include flame-retardant epoxy resins such as a bisphenol A epoxy resin, a bisphenol F epoxy resin, a bisphenol AD epoxy resin, a bisphenol S epoxy resin, a glycidyl ester epoxy resin, a glycidyl amine epoxy resin, a novolac epoxy resin, a glycidyl ether epoxy resin of a bisphenol A propylene oxide adduct, a hydrogenated bisphenol A (or F) epoxy resin, a fluorinated epoxy resin, a rubber-modified epoxy resin containing polybutadiene or NBR, and a glycidyl ether of tetrabromobisphenol A, a p-hydroxybenzoic acid glycidyl ether ester epoxy resin, an m-aminophenol epoxy resin, a diaminodiphenylmethane epoxy resin, a urethane-modified epoxy resin having a urethane linkage, alicyclic epoxy resins, N,N-diglycidylaniline, N,N-diglycidyl-o-toluidine, triglycidyl isocyanurate, divinylbenzene dioxide, resorcinol diglycidyl ether, polyalkylene glycol diglycidyl ether, glycol diglycidyl ether, diglycidyl esters of aliphatic polybasic acids, glycidyl ethers of polyhydric aliphatic alcohols such as glycerol, a chelate-modified epoxy resin, a hydantoin epoxy resin, epoxidized unsaturated polymers such as a petroleum resin, an amino-containing glycidyl ether resin, and epoxy compounds obtained by making a bisphenol A (or F), a polybasic acid, or the like undergo an addition reaction with the above-mentioned epoxy resins. However, the epoxy resin is not limited to the above-mentioned epoxy resins, and epoxy resins commonly used nay be used.

The polyalkylene glycol diglycidyl ether includes polyethylene glycol diglycidyl ether, polypropylene glycol diglycidyl ether and the like. The glycol diglycidyl ether includes neopentyl glycol diglycidyl ether, 1,4-butanediol diglycidyl ether, 1,6-hexanediol diglycidyl ether, cyclohexane dimethanol diglycidyl ether and the like. The diglycidyl ester of the aliphatic polybasic acid includes diglycidyl ester of dimer acid, diglycidyl ester of adipic acid, diglycidyl ester of sebacic acid, diglycidyl ester of maleic acid. The glycidyl ether of polyvalent aliphatic alcohol includes trimethylol propane triglycidyl ether, trimethylol ethane triglycidyl ether, caster oil modified polyglycidyl ether, propoxylated glycerin triglycidyl ether, sorbitol polyglycidyl ether and the like. An epoxy compound obtained from the addition reaction of polybasic acid and the like to an epoxy resin as described in WO 2010/098950 includes addition reaction products of the dimmer of talloil fatty acid (dimmer acid) and bisphenol A epoxy resin. These epoxy resins can be used individually or in the combination of two or more kinds.

In addition, the polyalkylene glycol diglycidyl ether, the glycol diglycidyl ether, the diglycidyl ester of aliphatic polybasic acid, the glycidyl ether of polyvalent aliphatic alcohol are epoxy resins having relatively lower viscosity, and serve as a reactive diluent in the case where these are used with other epoxy resins such as bisphenol A epoxy resin and bisphenol. F epoxy resin. Then, the balance between the viscosity of the composition and the physical property of the cured product can be improved. The amount of these epoxy resin as reactive diluent is preferably 0.5 to 20% by mass, more preferably 1 to 10% by mass, and even preferably 2 to 5% by mass of 100% by mass of the epoxy resin (A).

The chelate-modified epoxy resin is a reaction product of the epoxy resin and a compound containing a chelate functional group (chelate ligand). In the case of adding the chelate-modified epoxy resin to the curable resin composition of the present invention to use as adhesive for vehicle, adhesiveness to the surface of the metal material polluted with oily substances can be improved. The chelate functional group is a functional group of a compound having multiple coordinations capable of chelating with metal ions in a molecule, and includes an acid group containing phosphorus (for example, —PO(OH)$_2$), a carboxyl group (—CCH), an acid group containing sulfur (for example, —SO$_3$H), an amino group and a hydroxyl group (particularly, hydroxyl groups neighboring each other in an aromatic ring) and the like. The chelate ligand includes ethylenediamine, bipyridine, ethylenediamine tetraacetic acid, phenanthroline, porphyrin, crown ether and the like. A commercially available chelate-modified epoxy resin includes adeka resin EP-49-10N manufactured by ADEKA CORPORATION and the like. The amount of the chelate-modified epoxy resin is preferably 0.1 to 10% by mass, and more preferably 0.5 to 3% by mass per 100% by mass of the epoxy resin (A).

Among these epoxy resins, the epoxy resin having at least two epoxy groups in a molecule is preferable because three dimensional networks are easily introduced in the cured product due to high reactivity during the cure.

Among the epoxy resins, bisphenol A epoxy resin and bisphenol F epoxy resin are preferable, and bisphenol A epoxy resin is particularly preferable due to high elastic modulus of the cured product obtained, excellent heat resistance and adhesiveness, and relatively low cost.

In addition, among various epoxy resins, the epoxy resin has preferably the epoxy equivalent of less than 220, more preferably the epoxy equivalent of 90 or more and less than 210, and even preferably the epoxy equivalent of 150 or more and less than 200 in the view of the high elastic modulus and heat resistance of the cured product obtained.

Particularly, bisphenol A epoxy resin and bisphenol F epoxy resin having the epoxy equivalent of less than 220 are preferable because these are liquid in ambient temperature and the handling of the obtained curable resin composition is good.

Bisphenol A epoxy resin and bisphenol F epoxy resin having the epoxy equivalent of 220 or more and less than 5000 are contained in the amount of preferably 40% by mass or less, more preferably 20% by mass or less of 100% by mass of the epoxy resin (A) in the view of excellent impact resistance of the cured products obtained.

The amount of the rubber-modified epoxy resin and/or the urethane-modified epoxy resin is preferably 40% by mass or less, and more preferably 20% by mass or less of 100% by mass of the epoxy resin (A). In the case of adding in such an amount, the cured product obtained has excellent impact resistance.

The curable resin composition (II) of the second embodiment of the present invention essentially contains as the epoxy resin bisphenol A epoxy resin, rubber-modified epoxy resin and/or urethane-modified epoxy resin. Thus, the obtained curable resin composition has excellent thixotropy and storage stability and T peel adhesion and impact and peel-resistant adhesion of the cured product by combining rubber-modified epoxy resin and/or urethane-modified epoxy resin with polymer fine particle (B) as set forth below.

In the curable resin composition (II), as the epoxy resin (A) except bisphenol A epoxy resin, rubber-modified epoxy resin and urethane-modified epoxy resin, various epoxy resins exemplified by the above curable resin composition (I) may be used.

In the curable resin composition (II), the amount of bisphenol A epoxy resin is preferably 20 to 95% by mass, more preferably 40 to 90% by mass, even preferably 50 to 88% by mass, and particularly preferably 60 to 85% by mass of 100% by mass of the epoxy resin (A). In case of less than 20% by mass, the heat resistance and elastic modulus (rigidity) of the cured product obtained is lowered in some cases. In case of more than 95% by mass, the cured product obtained becomes brittle and the impact and peel-resistant adhesion is lowered in some cases.

In the curable resin composition (II), the epoxy equivalent of bisphenol A epoxy resin is preferably less than 220, more preferably 90 or more and less than 210, and even preferably 150 or more and less than 200 due to high elastic modulus and excellent heat resistance of the cured product obtained.

In the curable resin composition (II), the amount of bisphenol A epoxy resin having the epoxy equivalent of 220 or more and less than 5000 is preferably 20% by mass or less, more preferably 10% by mass or less of the 100% by mass of the epoxy resin (A) in the viewpoint of excellent impact resistance of the cured product obtained.

The rubber-modified epoxy resin is a reaction product having 1.1 or more of epoxy groups, and preferably 2 or more of epoxy groups on average per one molecule obtained by reacting the rubber and the epoxy group-containing compound. The rubber includes rubber polymers such as acrylonitrile butadiene rubber (NBR), styrene butadiene rubber (SBR), hydrogenated nitrile rubber (HNBR), ethylenepropylene rubber (EPDM), acrylate rubber (ACM), butyl rubber (IIR), butadiene rubber, polyoxyalkylene such as polypropylene oxide, polyethylene oxide, polytetramethylene oxide and the like. The rubber polymer has preferably a reactive group such as an amino group, a hydroxyl group, or a carboxyl group at terminal. The rubber-modified epoxy resin used in the present invention is a reaction product obtained by reacting the rubber polymer and the epoxy resin at appropriate compounding ratio according to known methods. Among these, acrylonitrile-butadiene rubber-modified epoxy resin and polyoxyalkylene-modified epoxy resin are preferable in the view of the T peel adhesion of the obtained curable resin composition and the peel and impact-resistant adhesion, and acrylonitrile-butadiene rubber-modified epoxy resin is more preferable. For example, acrylonitrile-butadiene rubber-modified epoxy resin is obtained by the reaction of NBR having carboxyl group at terminal (CTBN) with bisphenol A epoxy resin. In addition, polyoxyalkylene modified epoxy resin is obtained by the reaction of polyoxyalkylene having amino group at terminal and bisphenol A epoxy resin.

The amount of acrylonitrile monomer is preferably 5 to 40% by mass, more preferably 10 to 35% by mass, even preferably 15 to 30% by mass of 100% by mass of the acrylonitrile-butadiene rubber in the view of the T peel adhesion of the obtained curable resin composition and the impact and peel-resistant adhesion. The amount of acrylonitrile monomer is particularly preferably 20 to 30% by mass of 100% by mass of the acrylonitrile-butadiene rubber in the view of the thixotropy or the obtained curable resin composition.

The average number of epoxide reactive terminal group per one molecule of the rubber-modified epoxy resin is preferably 1.5 to 2.5, more preferably 1.8 to 2.2. The rubber-modified epoxy resin has the number average molecular weight of preferably 2000 to 10000, more preferably 3000 to 8000, and even preferably 4000 to 6000, based on the molecular weight of polystyrene measured by GPC.

The method for manufacturing the rubber-modified epoxy resin is not limited particularly, and can be prepared by reacting the rubber and the epoxy group-containing compound under the condition where the amount of the epoxy group-containing compound is large. Concretely, is preferable to prepare the rubber-modified epoxy resin by reacting the epoxy group-containing compound having 2 or more equivalents per one equivalent of epoxy reactive terminal of the rubber. It is more preferable to prepare the rubber-modified epoxy resin by reacting the epoxy group-containing compound in a sufficient amount such that the obtained product is a mixture of adduct of the rubber and the epoxy group-containing compound and the free epoxy group-containing compound. The rubber-modified epoxy resin is prepared by heating at 100 to 250° C. under the presence of catalyst such as phenyl dimethyl urea and triphenylphosphine. The epoxy group-containing compound used in the preparation of the rubber-modified epoxy resin is not limited particularly. The epoxy group-containing compound is preferably bisphenol A epoxy resin and bisphenol F epoxy resin, and more preferably bisphenol A epoxy resin. In the case where the epoxy group-containing compound is used in an excess amount for the preparation of the rubber-modified epoxy resin, the rubber-modified epoxy resin does not contain the unreacting and remaining epoxy group-containing compound after reaction.

The rubber modified epoxy resin can be modified by preliminarily reacting bisphenol component. The amount of bisphenol component used for the modification is preferably 3 to 35 parts by mass, more preferably 5 to 25 parts by mass of 100 parts by mass of the rubber component of the rubber-modified epoxy resin. A cured product of a curable resin composition containing a modified rubber-modified epoxy resin has excellent adhesive durability after subjecting to high temperature and excellent impact resistance at lower temperature.

The glass transition temperature (Tg) of the rubber-modified epoxy resin is not limited particularly. The rubber-modified epoxy resin has the glass transition temperature of preferably −25° C. or less, more preferably −35° C. or less, even preferably −40° C. or less, and particularly preferably −50° C. or less.

In the curable resin composition (II), the amount of the rubber-modified epoxy resin is preferably 1 to 40% by mass, more preferably 3 to 30% by mass, even preferably 5 to 25% by mass, and particularly preferably 10 to 20% by weigh of 100% by mass of the epoxy resin (A). In the case of less than 1% by mass, the cured product obtained becomes brittle and exhibits lower impact and peel-resistant adhesion in some cases. In the case of more than 40% by mass, the cured product obtained exhibits lower heat resistance and elastic modulus (rigidity) in some cases.

The rubber-modified epoxy resin can be used individually or in the combination of two or more kinds.

The urethane-modified epoxy resin is a reaction product having 1.1 or more epoxy groups, preferably 2 or more epoxy groups on average per one molecule obtained by reacting a compound having a group having a reactiveness to an isocyanate group and an epoxy group, and a urethane prepolymer containing an isocyanate group. For example, the urethane-modified epoxy resin is obtained by reacting an epoxy compound having a hydroxyl group and a urethane prepolymer.

In the curable resin composition (II), the amount of the urethane modified epoxy resin is preferably 1 to 40% by mass, more preferably 3 to 30% by mass, even preferably 5 to 25% by mass, and particularly preferably 10 to 20% by mass of 100% by mass of the epoxy resin (A). In the case of less than 1% by mass, the cured product obtained becomes brittle and exhibits lower impact and peel-resistant adhesion in some cases. In the case of more than 40% by mass, the cured product obtained exhibits lower heat resistance and elastic modulus (rigidity) of the cured product obtained in some cases. The urethane-modified epoxy resin can be used individually or in the combination of two or more kinds.

<Polymer Fine Particle (B)>

The curable resin composition of the present invention uses 1 to 100 parts by mass of a polymer fine particle (B) or polymer fine particles (B) having a core-shell structure and diene rubber as the core layer relative to 100 parts by mass of the epoxy resin (A). The cured product obtained has excellent toughness and impact and peel-resistant adhesion from effects of improving toughness of the polymer fine particle (B).

The core layer of the polymer fine particle (B) is diene rubber having lower affinity with the epoxy resin (A), and the increase of the viscosity from the swelling of the core layer in the matrix resin is not found with time as described in JP2013-095786. In addition, the core layer is diene rubber, so that impact and peel-resistant adhesion of the cured product is higher compared with that using polymer fine particles having silicone rubber or acrylic rubber. However, when combining the polymer fine particle having the epoxy group and the rubber-modified epoxy resin and/or urethane-modified epoxy resin, or when combining inorganic filler (C) as set forth below, the composition has a tendency to increase the viscosity with time.

When the amount of the epoxy group of the polymer fine particle (B) is 0.01 to 0.2 mmol/g, the storage stability can be maintained favorably, and the cured product having excellent impact and peel-resistant adhesion can be obtained. In the case where the amount of the epoxy group of the polymer fine particle is less than 0.01 mmol/g, the composition after storage tends to increase the viscosity. In the case where the amount of the epoxy group of the polymer fine particle is more than 0.2 mmol/g, the composition after storage has a tendency to increase the viscosity and the cured product obtained has a tendency to decrease the impact and peel-resistant adhesion.

The amount of the epoxy group of the polymer fine particle (B) is 0.01 to 0.2 mmol/g, preferably 0.02 to 0.18 mmol/g, more preferably 0.03 to 0.15 mmol/g, even preferably 0.04 to 0.12 mmol/g, and particularly preferably 0.05 to 0.10 mmol/g in the viewpoint of the compatibility of the impact and peel-resistant adhesion of the cured product obtained and the storage stability of the composition.

The amount of the polymer fine particle (B) is 1 to 100 parts by mass, preferably 2 to 70 parts by mass, more preferably 3 to 50 parts by mass, and particularly preferably 4 to 20 parts by mass from the balance between the easy handling of the curable resin composition obtained and effects of improving toughness of the cured product obtained.

The particle diameter of the polymer fine particles is not particularly limited, and the volume average particle diameter (Mv) of the polymer fine particles is preferably 10 to 2000 nm, more preferably 30 to 600 nm, further preferably 50 to 400 nm, and especially preferably 100 to 200 nm in the view of industrial productivity. The volume average particle diameter of the polymer fine particles can be measured by using Microtrack UPA 150 (manufactured by Nikkiso Co., Ltd.).

The curable resin composition (1) of the first embodiment of the present invention contains the polymer fine particles (B) and fumed silica as the inorganic filler (C). Thus, in the case where the curable resin composition contains the inorganic filler (C), the obtained curable resin composition indicates favorable thixotropy using the polymer fine particle (B) having a relatively large particle diameter. Concretely, the polymer fine particle (B) has the volume average particle diameter (Mv) of preferably 150 to 600 nm, more preferably 180 to 400 nm, and particularly preferably 200 to 300 nm. When the volume average particle diameter is less than 150 nm, the curable resin composition has lower thixotropy in some cases. When the volume average particle diameter is more than 600 nm, the toughness of the cured product is lower in some cases.

The curable resin composition (II) of the second embodiment of the present invention contains as the epoxy resin (A) rubber-modified epoxy resin and/or urethane-modified epoxy resin, and the polymer fine particle (B). Thus, when the epoxy resin (A) contains a given modified epoxy resin, the obtained curable resin composition indicates favorable thixotropy using the polymer fine particle (B) having a relatively small particle diameter as opposite to the previous descriptions. Concretely, the polymer fine particle (B) has the volume average particle diameter (Mv) of preferably 30 to 150 nm, more preferably 50 to 130 nm, and particularly preferably 70 to 110 nm. In the case where the volume average particle diameter is less than 30 nm, the viscosity of the curable resin composition is high and the workability is deteriorated in some cases. In the case where the volume average particle diameter is more than 150 nm, the curable resin composition exhibits lower thixotropy.

In the composition of the present invention, the polymer fine particles (B) preferably have half value width of 0.5 times or more and 1 time or less the number average particle diameter in the number particle size distribution, because the curable resin composition obtained has lower viscosity and is handled easily.

The polymer fine particles (B) have preferably the maximal of two or more in the number particle size distribution in the view of easily realizing a given particle size distribution, more preferably the maximal of two or three, and further preferably the maximal of two in the view of the work and cost during manufacture. Especially, it is preferable that the polymer fine particles (B) contain polymer fine particles having the volume average particle diameter of not less than 10 nm and less than 150 nm in an amount of 10 to 90% by mass and polymer fine particles having the volume average particle diameter of not less than 150 nm and not more than 2000 nm in an amount of 90 to 10% by mass.

It is preferable that the polymer fine particles (B) are dispersed at the state of the primary particle in the curable resin composition. In the present invention, "the polymer fine particles are dispersed at the state of the primary particle in the curable resin composition" (hereinafter referred to as primary dispersion in some cases) mean that the polymer fine particles are substantially dispersed individually (without contacting each other). The dispersion state of the polymer fine particles can be confirmed by dissolving a part of the curable resin composition in a solvent such as methylethylketone, and measuring the particle diameter by using a particle diameter measuring device with laser beam scattering and the like.

The value of the volume average particle diameter (Mv)/the number average particle diameter (Mn) as the particle diameter measurement is not particularly limited, and the value of the volume average particle diameter (Mv)/the number average particle diameter (Mn) is preferably 3 or less, more preferably 2.5 or less, even preferably 2 or less, and particularly preferably 1.5 or less. In the case where the value of the volume average particle diameter (Mv)/the number average particle diameter (Mn) is 3 or less, the polymer fine particles are favorably dispersed. On the other hand, the curable resin composition having the particle size distribution of more than 3 has lower physical properties such as the impact resistance and adhesiveness of the cured product obtained in some cases. The volume average particle diameter (Mv)/the number average particle diameter (Mn) can be measured by using Microtrack UPA 150 (manufactured by Nikkiso Co., Ltd.), and dividing Mv by Mn.

"Stable dispersion" of the polymer fine particles means that the polymer fine particles are dispersed for a long period under general conditions without aggregating, separating and precipitating in the continuous layer. Preferably, the distribution of the polymer fine particles substantially does not change in the continuous layer, and "stable dispersion" can be maintained even when the composition containing the polymer fine particles is heated in the range of no danger so as to stir the composition and lower the viscosity of the composition. The polymer fine particles (B) may be used individually or in combination of two or more kinds.

The structure of the polymer fine particle (B) is not limited particularly, but the polymer fine particle (B) preferably has the core-shell structure, that is, the core-shell structure of two or more layers. In addition, the polymer fine particle (B) can have a structure having three or more layers comprising a core layer, an intermediate layer coated on the core layer, and a shell layer coated on the intermediate layer.

Hereinafter, each layer of the polymer fine particle is concretely explained.

<Core Layer>

The core layer is preferably an elastic core layer having a rubber property in order to improve toughness of the cured material from the curable resin composition of the present invention. For the rubber property, the elastic core layer of the present invention has the gel content of preferably not less than 60% by mass, more preferably not less than 80% by mass, further preferably not less than 90% by mass, and especially preferably not less than 95% by mass. The gel content used herein means that a ratio of an insoluble amount to a total amount of an insoluble amount and a soluble amount in the case where 0.5 g of polymer fine particles obtained by coagulation and dry was immersed in 100 g of toluene, and an insoluble part and a soluble part were divided after standing at 23° C. for 24 hours.

A monomer (conjugated diene monomer) for constituting the diene rubber used in the elastic core layer includes 1,3-butadiene, isoprene, 2-chloro-1,3-butadiene, 2-methyl-1,3-butadiene and the like. These may be used alone or in combination of two or more monomers.

From the view of effects of highly improving the toughness and the impact and peel-resistant adhesion as well as hardly increasing the viscosity with time from the swelling of the core due to lower affinity with the matrix resin, a butadiene rubber using 1,3-butadiene, or a butadiene-styrene rubber of a copolymer of 1,3-butadiene and styrene is preferable, and a butadiene rubber is more preferable. In addition, a butadiene-styrene rubber is more preferable in the view of improving the transparency of the cured product obtained from the adjustment of refractive index.

A vinyl monomer polymerizable with the diene monomer includes vinyl arenes such as styrene, α-methylstyrene, monochlorostyrene, dichlorostyrene; vinyl carboxylic acids such as acrylic acid, methacrylic acid; vinyl cyanides such as acrylonitrile, methacrylonitrile; halogenated vinyls such as chloro vinyl, bromo vinyl, chloroprene; vinyl acetate; alkenes such as ethylene, propylene, butylene, isobutylene; a multifunctional monomer such as diallylphthalate, triallylcyanurate, triallylisocyanurate, divinylbenzene. The vinyl monomer may be used individually or in combination of two or more vinyl monomers. The monomer is especially preferably styrene.

The copolymerizable vinyl monomer can be contained in the range of preferably 0 to 50% by mass, more preferably 0 to 30% by mass, and even preferably 0 to 10% by mass of 100% by mass of the core layer.

In the present invention, the glass transition temperature of the core layer is preferably not more than 0° C., more preferably not more than −20° C., further preferably not more than −40° C., and especially preferably not more than −60° C. in order to improve the toughness of the cured product obtained. Hereinafter, the glass transition temperature is referred to as "Tg" in some cases.

The volume average particle diameter of the core layer is preferably 0.03 to 2 μm and more preferably 0.05 to 1 μm. It is difficult to stably obtain a core layer having the volume average particle diameter of less than 0.03 μm in many cases. In the case of the volume average particle diameter of greater than 2 μm, the heat-resistance and impact resistance of the molding material are lowered in some cases. The volume average particle diameter can be measured by using Microtrac UPA 150 (manufactured by Nikkiso Co., Ltd).

The amount of the core layer is preferably 40 to 97% by mass, more preferably 50 to 95% by mass, further preferably 70 to 93% by mass, and especially preferably 80 to 90% by mass per 100% by mass of the whole polymer fine particles. In the case of the core layer of less than 40% by mass, effect of improving toughness of the cured product may be lowered. In the case of the core layer or more than 97% by mass, the polymer fine particles are easily aggregated, and the handling of the curable resin composition may become difficult due to high viscosity.

In the present invention, the core layer may be composed of monolayer in some cases, and may be composed of multilayers. In the case where the core layer is composed of multilayer, the polymer composition of each layer may be different each other.

<Intermediate Layer>

In the present invention, an intermediate layer may be formed between the core layer and the shell layer as necessary. Especially, the intermediate layer may be formed as a rubber-crosslinked layer as set forth below. It is preferable that the intermediate layer is not contained, particularly the following rubber-crosslinked layer is not contained in the viewpoint of effects of improving the toughness and the impact and peel-resistant adhesion of the cured product obtained.

When the intermediate layer is used, the ratio of the intermediate layer is preferably 0.1 to 30 parts by mass, more preferably 0.2 to 20 parts by mass, even preferably 0.5 to 10 parts by mass, and particularly preferably 1 to 5 parts by mass per 100 parts by mass of the core layer.

The rubber-crosslinked layer is a polymer of the intermediate layer polymerized with rubber-crosslinked layer components containing 30 to 100% by mass of a multifunctional monomer having two or more radically polymerizable double bonds in the same molecule and 0 to 70% by mass of other vinyl monomer. The rubber-crosslinked layer has effects of lowering the viscosity of the curable resin composition of the present invention, and improving the dispersibility of the polymer fine particles (B) to the epoxy resin (A). In addition, the rubber crosslinked layer has an effect of improving crosslink density of the core layer and graft efficiency of the shell layer.

The multifunctional monomer does not contain conjugated diene monomer such as butadiene, and includes allyl alkyl(meth)acrylate such as allyl(meth)acrylate, allyl alkyl (meth)acrylate; allyl oxy alkyl(meth)acrylate; multifunctional (meth)acrylate having two or more (meth)acrylic groups such as (poly) ethylene glycol di(meth)acrylate, butane diol di(meth)acrylate, ethylene glycol di(meth)acrylate, triethylene glycol di(meth)acrylate, tetraethylene glycol di(meth)acrylate; diallyl phthalate, triallyl cyanurate, triallyl isocyanurate, divinylbenzene and the like. Allyl methacrylate, triallyl isocyanurate are especially preferable. In the present invention, (meth)acrylate means acrylate and/or methacrylate.

<Shell Layer>

The shell layer existing at outermost of the polymer fine particles is a polymer polymerized with a monomer for forming the shell layer. The shell layer comprises a polymer for improving the compatibility of the polymer fine particles (B) and the epoxy resin (A) and dispersing the polymer fine particles at the state of primary particle in the curable resin composition or the cured product obtained therefrom of the present invention.

The shell polymer for forming the shell layer is preferably grafted on the core layer and/or the intermediate layer. When the phrase "grafted on the core layer" is referred to, the present invention contains an embodiment in which the shell layer is grafted on the intermediate layer in the case of forming the intermediate layer on the core layer. More precisely, it is preferable that a monomer used in the formation of the shell layer is graft-polymerized on the core polymer for forming the core layer (when the intermediate layer is contained, the monomer is graft-polymerized on the intermediate polymer for forming the intermediate layer, the same applies hereinafter), and the shell polymer is chemically bonded to the rubber polymer (when the rubber polymer is covered with the intermediate layer, it is preferable that the shell polymer is chemically bonded to the intermediate layer polymer). It is preferable that the shell polymer is formed by graft-polymerizing the monomer for forming the shell layer under the presence of the core polymer (when the core polymer is covered with the intermediate polymer, the core polymer in which the intermediate polymer is formed), and a part or all of the core polymer is covered with the shell polymer. Such a polymerization can be carried out by adding a monomer for constituting the shell polymer to a latex containing the core polymer prepared in the state of an aqueous latex, and polymerizing the monomer and the core polymer.

The monomer for forming the shell layer is preferably the aromatic vinyl monomer, the vinyl cyanide monomer, the (meth)acrylate monomer, and more preferably the aromatic vinyl monomer, the (meth)acrylate monomer, and most preferably (meth)acrylate monomer in the view of the compatibility and the dispersibility of the polymer fine particle (B) of the curable resin composition. These monomers for forming the shell layer may be used individually or in the appropriate combination.

The total amount of the aromatic vinyl monomer, the vinyl cyanide monomer, and the (meth)acrylate monomer is preferably 10 to 99.5% by mass, more preferably 50 to 99% by mass, even preferably 65 to 98% by mass, particularly preferably 67 to 80% by mass, and most preferably 67 to 85% by mass of 100% by mass of the monomer for forming the shell layer.

The monomer for forming the shell layer preferably contains a monomer having one or more reactive groups selected from the group consisting of an epoxy group, an oxetane group, a hydroxyl group, an amino group, an imide group, a carboxylic acid group, a carboxylic acid anhydride group, a cyclic ester, a cyclic amide group, a benzoxazine group, and a cyanate ester group, and more preferably contains a monomer having an epoxy group, in the view of the chemical bond of the polymer fine particles (B) to the epoxy resin (A) in order to maintain the good dispersibility without coagulating the polymer fine particles (B) in the cured material and the polymer.

The amount of the monomer having an epoxy group is preferably 0.5 to 90% by mass, more preferably 1 to 50% by mass, even preferably 2 to 35% by mass, particularly preferably 3 to 20% by mass, and most preferably 3 to 15% by mass of 100% by mass of the monomer for forming the shell layer. When the amount of the monomer having an epoxy group is less than 0.5% by mass of 100% by mass of the monomer for forming the shell layer, effect of improving the impact resistance of the cured product is lowered in some cases, and further the storage stability and impact and peel-resistant adhesion of the curable resin composition also are decreased. When the amount of the monomer having an epoxy group is more than 90% by mass of 100% of the monomer for forming the shell layer, effect of improving the impact resistance is lowered, and further the storage stability and the impact and peel-resistant adhesion of the curable resin composition are deteriorated in some cases. The monomer having an epoxy group is preferably used for the formation of the shell layer, and more preferably used for the shell layer solely.

In addition, a multifunctional monomer having two or more radically polymerizable double bonds is preferably used as a monomer for forming the shell layer because the swelling of the polymer fine particles is prevented in the curable resin composition, or the viscosity of the curable resin composition becomes lower to improve the handling. On the contrary, it is preferable that the multifunctional monomer having two or more radically polymerizable double bonds is not used as the monomer for forming the shell layer in the viewpoint of effects of improving the toughness and the adhesiveness to impact and peel of the cured product obtained.

The multifunctional monomer may be contained in an amount of, for example, 0 to 20% by mass, preferably 1 to 20% by mass, and more preferably 5 to 15% by mass per 100% by mass of the monomer for forming the shell layer.

Concrete example of the aromatic vinyl monomer includes styrene, α-methyl styrene, p-methyl styrene, divinyl benzene and the like.

Concrete example of the vinyl cyanide monomer includes acrylonitrile, and methacrylonitrile.

The concrete example of the (meth)acrylate monomer includes (meth)acrylic acid alkyl ester such as methyl(meth)acrylate, ethyl(meth)acrylate, butyl(meth)acrylate; (meth)acrylic acid hydroxyl alkyl ester such as hydroxy ethyl (meth)acrylate, hydroxy butyl(meth)acrylate and the like.

Concrete example of the monomer having an epoxy group includes a vinyl monomer containing a glycidyl group such as glycidyl(meth)acrylate, 4-hydroxy butyl(meth)acrylate glycidyl ether, allyl glycidyl ether and the like.

Concrete example of the multifunctional monomer having two or more radically polymerizable double bonds is exemplified by the same monomer as the above-mentioned multifunctional monomer. The multifunctional monomer is preferably allylmethacrylate and triallylisocyanurate.

In the present invention, the shell layer is a polymer polymerized with (100% by mass of) the monomer for forming the shell layer containing 0 to 50% by mass (preferably 1 to 50% by mass, more preferably 2 to 48% by mass) of the aromatic vinyl monomer (preferably styrene), 0 to 50% by mass (preferably 0 to 30% by mass, more preferably 10 to 25% by mass) of the vinyl cyanide monomer (preferably acrylonitrile), 0 to 100% by mass (preferably 0 to 90% by mass, more preferably 20 to 85% by mass) of (meth)acrylate monomer (preferably methyl methacrylate), and 0.5 to 50% by mass (preferably 1 to 30% by mass, more preferably 2 to 20% by mass) of the monomer having an epoxy group (preferably glycidyl methacrylate). This shell polymer can exhibit well-balanced effects of improving the desired toughness and the mechanical property. Particularly, the glycidyl methacrylate is preferable because interface adhesion with the epoxy resin (A) is improved in the case where the glycidyl methacrylate is contained in the shell layer. These monomers may be used individually or in the combination of two or more monomers. The shell layer may be formed by using other monomer component in addition to the above monomers.

The curable resin composition (I) of the first embodiment of the present invention contains the polymer fine particles (B) and fumed silica as the inorganic filler (C) as set forth below. In such a case, when the polymer fine particles (B) are formed with the vinyl cyanide monomer (preferably acrylonitrile) as the monomer for forming the shell layer, the curable resin composition obtained indicates favorable thixotropy. In order to exhibit favorable thixotropy, the amount of the vinyl cyanide monomer is preferably 5 to 70% by mass, more preferably 10 to 50% by mass, even preferably 15 to 40% by mass, and particularly preferably 20 to 30% by mass of 100% by mass of the monomer for forming the shell layer of the polymer fine particles (B). In the case of less than 5% by mass of the vinyl cyanide monomer, the curable resin composition exhibits lower thixotropy in some cases. In the case of more than 70% by mass of the vinyl cyanide monomer, the curable resin composition exhibits high viscosity and poor workability.

The curable resin composition (II) of the second embodiment of the present invention contains as the epoxy resin (A) rubber-modified epoxy resin and/or urethane-modified epoxy resin. In such a case, when the polymer fine particles (B) are formed with the relatively large amount of the (meth)acrylate monomer (preferable methyl methacrylate), the curable resin composition obtained exhibits favorable thixotropy. In order to exhibit favorable thixotropy, the amount of (meth)acrylate monomer is 10 to 99% by mass, more preferably 20 to 97% by mass, even preferably 30 to 95% by mass, and particularly preferably 50 to 90% by mass of 100% by mass of the monomer for forming the shell layer of the polymer fine particles (B). In the case of less than 10% by mass of the (meth)acrylate monomer, the curable resin composition exhibits lower thixotropy in some cases. In the case of more than 99% by mass of the (meth)acrylate monomer, the curable resin composition exhibits high viscosity and poor workability.

The graft rate of the shell layer is preferably 70% or more, more preferably 80% or more, and further preferably 90% or more. In the case of less than 70% of the graft rate, the viscosity of the curable resin composition may be increased. Incidentally, the method of calculating the graft rate is as follows.

The powder of the polymer fine particles is obtained by coagulating and dehydrating the aqueous latex containing the polymer fine particles, and drying the polymer fine particles. Then, 2 g of the powder of the polymer fine particles is immersed in 100 g of methylethylketone (MEK) at 23° C. for 24 hours, separated in MEK soluble content and MEK insoluble content, and separated methanol insoluble content from MEK soluble content. Thus, the graft rate is calculated by determining a ratio of MEK insoluble content to the total content of MEK insoluble content and methanol insoluble content.

<Method for Preparing Polymer Fine Particles>
(Method for Preparing Core Layer)

The core layer for constituting the polymer fine particles used in the present invention can be prepared according to emulsion polymerization, suspension polymerization, micro-suspension polymerization and the like, and methods described in WO2005/028546 can be used (Method of Forming Shell Layer and Intermediate Layer)

The intermediate layer can be formed by polymerizing a monomer for forming the intermediate layer with a known radical polymerization. In the case where the rubber elastomer constituting the core layer is obtained as an emulsion, it is preferable that the polymerization of the monomer having two or more radically polymerizable double bonds is carried out with the emulsion polymerization.

The shell layer can be formed by polymerizing a monomer for forming the shell layer with a known radical polymerization. In the case where a polymer particle precursor constituting the core layer or the core layer covered with the intermediate layer is obtained as an emulsion, it is preferable that the polymerization of the monomer for forming the shell layer is carried out with the emulsion polymerization, and the shell layer can be prepared according to methods of WO 2005/028546.

The following dispersants can be mentioned as examples of emulsifiers (dispersants) usable in the emulsion polymerization: various acids including alkyl or aryl sulfonic acids such as dioctylsulfosuccinic acid and dodecylbenzenesulfonic acid, alkyl or arylether sulfonic acids, alkyl or arylsulfonic acids such as dodecylsulfuric acids, alkyl or arylether sulfuric acids, alkyl or aryl-substituted phosphoric acids, alkyl or arylether-substituted phosphoric acids, N-alkyl or arylsarcosinic acids such as dodecylsarcosinic acid, alkyl or arylcarboxylic acids such as oleic acid and stearic acid, and alkyl or arylether carboxylic acids, and anionic emulsifiers (dispersants) such as alkali metal salts or ammonium salts of these acids; nonionic emulsifiers (dispersants) such as alkyl or aryl-substituted polyethylene glycols; and derivatives of polyvinyl alcohol, alkyl-substituted celluloses, polyvinyl pyrrolidone, and polyacrylic acid. Any of these emulsifiers (dispersants) may be used alone, or two or more of these may be used in combination.

The amount of the emulsifier (dispersant) is preferably as small as possible, but the dispersion stability of the polymer fine particles in the aqueous latex should be secured. The emulsifier (dispersant) preferably has as high water solubility as possible. An emulsifier (dispersant) having high water solubility can be easily washed out with water, and thus its bad influence on the final cured product can be easily avoided.

In the case of adopting emulsion-polymerization, as known initiators, thermal decomposition initiator such as 2,2'-azobisisobutylonitrile, hydrogen peroxide, potassium persulphate, ammonium persulfate can be used.

In addition, redox type initiators of peroxides such as organic peroxides (e.g. t-butylperoxy isopropyl carbonate, p-menthane hydroperoxide, cumene hydroperoxide, dicumyl peroxide, t-butyl hydroperoxide, di-t-butyl peroxide, t-hexyl peroxide, etc.) and inorganic peroxides (e.g. hydrogen peroxide, potassium persulfate, ammonium persulfate, etc.) in combination with reducing agents (e.g. sodium formaldehyde sulfoxylate, glucose, etc.) as needed and transition metal salts (e.g. ferrous sulfate, etc.) as needed, chelating agents (disodium ethylenediaminetetraacetate, etc.) as needed, or further phosphorus-containing compounds (e.g. sodium pyrophosphate, etc.) as needed can also be used In the case of polymerization using a redox type initiator, it is possible to carry out the polymerization even at a low temperature at which the peroxide does not cause substantially thermal decomposition and to set the polymerization temperature in a wide range, and therefore such a polymerization is preferable. Above all, organic peroxides such as cumene hydroperoxide, dicumyl peroxide, and t-butyl hydroperoxide are preferably used as a redox type initiator. The amount of the initiator or the amount of the reducing agent/transition metal salt/chelating agent when a redox type initiator is used can be used in the range known in the art. Also, when a monomer having two or more radically polymerizable double bonds is polymerized, a known chain transfer agent can be used in the known range. It is possible to additionally use a surfactant, and such use of the surfactant is also included in the known range.

The conditions to be applied in the polymerization, such as polymerization temperature, pressure, and deoxidation, are those known in the art. In addition, polymerization of the monomer for intermediate layer formation may be carried out in one stage or in two or more stages. Such polymerization includes, for example, a method of adding a monomer for intermediate layer formation at one time to an emulsion of a rubber elastic body constituting an elastic core layer, a method of continuously adding a monomer for intermediate layer formation to an emulsion of a rubber elastic body constituting an elastic core layer, and, in addition, a method of carrying out polymerization after adding an emulsion of a rubber elastic body constituting an elastic core layer to a reactor into which a monomer for intermediate layer formation has previously been charged.

<Inorganic Filler (C)>

The curable resin composition (I) of the first embodiment of the present invention essentially contains 0.5 to 30 parts by mass of an inorganic filler (C) relative to 100 parts by mass of the epoxy resin (A). In particular, it is preferred to use the inorganic filler composed of a silicic acid and/or a silicate having an average particle diameter of 5 to 500 nm. The curable resin composition (I) of the first embodiment of the present invention essentially comprises fumed silica as the inorganic filler (C). The inorganic filler (C) can be used according to necessity also in the curable resin composition (II) of the second embodiment of the present invention.

The inorganic filler (C) increases the viscosity of the curable resin composition of the present invention and imparts thixotropy thereto. Moreover, the inorganic filler (C) is a filler that is high in the degree of an effect of imparting thixotropy, affords cured products high in tensile strength and elastic modulus, and is less in deterioration of impact resistance as compared with inorganic fillers other than the inorganic filler (C), when combined with the epoxy resin (A) and the polymer fine particle (B) of the present invention.

Although specific examples of the silicic acid or the silicate are not particularly limited, dry silica, wet silica, aluminum silicate, magnesium silicate, or calcium silicate is preferred in terms of an effect of imparting thixotropy and the tensile strength or the elastic modulus of a cured product to be obtained, and dry silica, wet silica or calcium silicate is more preferred, dry silica or wet silica is even more preferred, and dry silica is particularly preferred.

Examples of a method for producing the dry silica include, but are not particularly limited to, a combustion method in which it is produced via a vapor phase reaction of silicon halide and hydrogen and an arc method in which quartz sand is heated and reduced, and then oxidized with air to obtain a silicic acid, and the combustion method is preferred in terms of the availability.

The dry silica produced by the combustion method is called "fumed silica" and examples thereof include hydrophilic fumed silica the surface of which is untreated and hydrophobic fumed silica which is produced by chemically treating a silanol group part of hydrophilic fumed silica with silane or siloxane, and hydrophobic fumed silica is preferred in terms of the dispersibility in the epoxy resin (A).

Examples of a surface treatment agent for hydrophobic fumed silica include silane coupling agents such as dimethyl dichlorosilane, (meth)acrylsilane, hexamethyldisilazane, octylsilane, hexadecylsilane, aminosilane, and methacrylsilane, octamethyltetracyclosiloxane, and polydimethylsiloxane. Hydrophobic fumed silica surface-treated with polydimethylsiloxane is preferred in terms of dispersion stability in the epoxy resin (A) and the storage stability of a curable resin composition to be obtained.

The wet silica is synthesized via a neutralization reaction of sodium silicate and a mineral acid (usually sulfuric acid). While examples of a method for producing wet silica include a precipitation method in which a neutralization reaction is performed at a relatively high temperature in a alkali pH range, growth of silica primary particles advances rapidly, and the primary particles aggregate, precipitate, and are obtained, and a gel method in which a neutralization reaction is performed in an acidic pH range and primary particles are allowed to aggregate with growth of the primary particles being inhibited, and are obtained, and the precipitated silica is preferred in terms of dispersibility in the epoxy resin (A).

Examples of a surface treatment agent for a wet silica include the compounds mentioned above as surface treatment agents for the above-described hydrophobic fumed silica.

The average particle diameter of the inorganic filler (C) is preferably 5 to 500 nm, more preferably 7 to 50 nm, even preferably 8 to 30 nm, and particularly preferably 10 to 20 nm. If the average particle diameter is less than 5 nm, the curable resin composition is high in viscosity and may lower workability. If the average particle diameter is larger than 500 nm, the tensile strength or the elastic modulus of a cured product to be obtained may be lowered. In the specification of the present application, the "average particle diameter" of the inorganic filler (C) means an average primary particle diameter averaged in number by a transmission electron microphotograph.

The specific surface area (determined by the BET adsorption method) of the inorganic filler (C) is preferably 10 $m^2/g$ or more, more preferably 30 to 500 $m^2/g$, and even more preferably 50 to 300 $m^2/g$. The BET adsorption method is a method involving making inert gas molecules having a known adsorption occupying surface area be physically adsorbed onto the powder particle surface at a liquefied nitrogen temperature and determining the specific surface area of the sample from the amount of adsorption.

The amount of the inorganic filler (C) to be used is 0.5 to 30 parts by mass, preferably 1 to 20 parts by mass, more preferably 1.5 to 10 parts by mass, and particularly preferably 2 to 5 parts by mass, relative to 100 parts by mass of the epoxy resin (A). If it is less than 0.5 parts by mass, the effect of illustrating thixotropy may not be sufficient, and if it is more than 30 parts by mass, the curable composition may be high in viscosity and may be difficult to handle. The lower limit of the amount of the inorganic filler (C) may be 0.1, 2, 3, 5, or 7 parts by mass relative to 100 parts by mass of the epoxy resin (A), and the upper limit of the amount of the inorganic filler (C) may be 100, 70, 50, 40, or 20 parts by mass relative to 100 parts by mass of the epoxy resin (A). The inorganic filler (C) may be used singly or two or more of the same may be used in combination.

Specific examples of the filler other than silicic acids or silicates include reinforcing such as dolomite and carbon black; tabular fillers such as talc and wollastonite; colloidal calcium carbonate, ground calcium carbonate, magnesium carbonate, titanium oxide, ferric oxide, a fine powder of aluminum, zinc oxide, and active zinc flower. Microballoons having an average particle diameter of 200 μm or less and a density of 0.2 g/cc or less can also be used. The particle diameter is preferably about 25 to 150 μm and the density is preferably about 0.05 to about 0.15 g/cc. Examples of commercially available microballoons include Dualite produced by Dualite Corporation, Expancel produced by Akzo Nobel N.V., and Microsphere produced by Matsumoto Yushi-Seiyaku Co., Ltd.

<Epoxy Curing Agent (D)>

In the present invention, an epoxy curing agent (D) may be used according to necessity.

If the curable resin composition of the present invention is used as a one-component type composition (a one-pack curable resin composition, etc.), it is preferred to choose the component (D) such that the adhesive is cured rapidly in heating to a temperature of 80° C. or higher, preferably a temperature of 140° C. or higher. On the contrary, it is preferred to choose the epoxy curing agent (D) and the curing accelerator (E) described below such that the adhesive cures very slowly at room temperature (about 22° C.) or temperatures up to at least 50° C. even if it cures.

As the epoxy curing agent (D), a component that exhibits activity by heating (sometimes referred to as a "latent curing agent") can be used. As such a latent epoxy curing agent, N-containing curing agents such as specific amine-based curing agents (including imine-based curing agents) can be used, and examples thereof include boron trichloride/amine complexes, boron trifluoride/amine complexes, dicyandiamide, melamine, diallylmelamine, guanamines (e.g., acetoguanamine and benzoguanamine), aminotriazoles (e.g., 3-amino-1,2,4-triazole), hydrazides (e.g., adipic acid dihydrazide, stearic acid dihydrazide, isophthalic acid dihydrazide, and semicarbazide), cyanoacetamide, and aromatic polyamines (e.g., metaphenylenediamine, diaminodiphenylmethane, and diaminodiphenylsulfone). It is more preferred to use dicyandiamide, isophthalic acid dihydrazide, adipic acid dihydrazide, or 4,4'-diaminodiphenylsulfone, and dicyandiamide is particularly preferred. Of the above-described curing agents (D), latent epoxy curing agents are preferred because they allow the curable resin composition of the present invention to be a one-pack type.

When the curable resin composition of the present invention is used as a two-component type composition or a multi-component type composition, amine-based curing agents (including imine-based curing agents) other than the above-described ones or mercaptan-type curing agents (also referred to as room temperature curable curing agents) can be chosen as an epoxy curing agent (D) that exhibits activity at a relatively low temperature of about room temperature.

Examples of the epoxy curing agent (D) having activity at relatively lower temperature include a linear aliphatic polyamine such as diethylenetriamine, triethylenetetramine, tetraethylenepentamine, dipropylenediamine, diethylaminopropylamine and hexamethylenediamine; a cyclic aliphatic polyamine such as N-aminoethylpiperazine, bis(4-amino-3-methylcyclohexyl)methane, menthenediamine, isophoronediamine, 4,4'-diaminodicyclohexylmethane, 3,9-bis(3-aminopropyl)-2,4,8,10-tetraoxaspiro[5.5]undecane (spiroacetaidiamine), norbornanediamine, tricyclodecanediamine and 1,3-bisaminomethylcyclohexane; an aliaromatic amine such as metaxylenediamine; a polyamine epoxy resin adduct which is a reaction product of an epoxy resin with an excessive amount of a polyamine; a ketimine which is a dehydration reaction product of a polyamine with a ketone such as methyl ethyl ketone and isobutyl methyl ketone; a poly(amido amine) which is produced by the condensation between a dimer of a tall oil fatty acid (dimer acid) with a polyamine; and an amide amine which is produced by the condensation between a tall oil fatty acid with a polyamine; polymercaptanes and the like.

As another example of the epoxy curing agent (D), an amine-terminated polyether which contains a polyether main chain and has 1 to 4 (preferably 1.5 to 3) amino groups and/or imino groups on average per molecule can also be used. Examples of a commercially available amine-terminated polyether include Jeffamine D-230, Jeffamine D-400, Jeffamine D-2000, Jeffamine D-4000 and Jeffamine T-5000 which are product.

As the epoxy curing agent (D), an amine-terminated rubber which contains a conjugated diene polymer main chain and has 1 to 4 (more preferably 1.5 to 3) amino groups and/or imino groups on average per molecule can also be used. In this regard, the main chain of the rubber is preferably a polybutadiene homopolymer or copolymer, more preferably a polybutadiene/acrylonitrile copolymer, particularly preferably a polybutadiene/acrylonitrile copolymer having an acrylonitrile monomer content of 5 to 40% by mass (more preferably 10 to 35% by mass, even preferably 15 to 30% by mass). An example of a commercially available amine-terminated rubber is Hypro 1300X16 ATBN which is a product manufactured by CVC Thermoset Specialties.

It is more preferred to use a poly(amido amine), an amine-terminated polyether and an amine-terminated rubber, and it is particularly preferred to use a combination of a poly(amido amine), an amine-terminated polyether and an amine-terminated rubber, among the above-mentioned amine-type curing agents having activity at a relatively lower temperature such as room temperature.

As the epoxy curing agent (D), acid anhydrides and phenols can also be used. Although acid anhydrides and phenols need high temperature as compared with amine-based curing agents, they are long in pot life and resulting cured products are good in balance of physical properties such as electric properties, chemical properties, and mechanical properties. Examples of the acid anhydrides include polysebacic poly anhydride polyazelaic polyanhydride, succinic anhydride, citraconic anhydride, itaconic anhydride, alkenyl-substituted succinic anhydrides, dodecenylsuccinic anhydride, maleic anhydride, tricarballylic anhydride, nadir anhydride, methylnadic anhydride, linoleic acid adducts with maleic anhydride, alkylated endoalkylenetetrahydrophthalic acid anhydrides, methyltetrahydrophthalic anhydride, tetrahydrophthalic anhydride, hexahydrophthalic anhydride, pyromellitic dianhydride, trimellitic anhydride, phthalic anhydride, tetrachlorophthalic anhydride, tetrabromophthalic anhydride, dichloromaleic anhydride, chloronadic anhydride, and chlorendic anhydride, and maleic anhydride-grafted polybutadiene. Examples of the phenols include phenol novolac, bisphenol A novolac, and cresol novolac.

The epoxy curing agent (D) may be used singly or two or more of the same may be used in combination. The epoxy curing agent (D) is used in an amount sufficient for curing the composition. Typically, a sufficient curing agent to consume at least 80% of the epoxide groups existing in the composition is supplied. An excessively large amount exceeding an amount required for the consumption of the epoxide groups is usually not necessary. The amount of the epoxy curing agent (D) to be used is preferably 1 to 80 parts by mass, more preferably 2 to 40 parts by mass, even more preferably 3 to 30 parts by mass, and particularly preferably 5 to 20 parts by mass, relative to 100 parts by mass of the epoxy resin (A). If it is less than 1 part by mass, the curability of the curable resin composition of the present invention may be impaired. If it is more than 80 parts by mass, the storage stability of the curable resin composition of the present invention may be impaired and may be difficult to handle.

<Curing Accelerator (E)>

The curing accelerator can be used in the present invention as necessary.

The curing accelerator (E) is a catalyst for promoting the reaction of the epoxy group and the epoxide reactive group of the curing agent, the adhesive and the like.

Examples of the curing accelerator (E) include ureas such as p-chlorophenyl-N,N-dimethylurea (trade name: Monuron), 3-phenyl-1,1-dimethylurea (trade name: Phenuron), 3,4-dichlorophenyl-N,N-dimethylurea (trade name: Diuron), N-(3-chloro-4-methylphenyl)-N',N'-dimethylurea (trade name: Chlortoluron), 1,1-dimothylphenylurea (trade name: Dyhard); tertiary amines such as benzyldimethylamine, 2,4,6-tris(dimethylaminomethyl)phenol, 2-(dimethylaminomethyl)phenol, 2,4,6-tris(dimethylaminomethyl)phenol incorporated in a poly(p-vinylphenol) matrix, triethylenediamine, and N,N-dimethylpiperidine; imidazoles such as C1-C12 alkyleneimidazole, N-arylimidazole, 2-methylimidazole, 2-ethyl-2-methylimidazole, N-butylimidazole, 1-cyanoethyl-2-undecylimidazoilum trimellitate, and addition products of epoxy resins and imidazole; and 6-caprolactam. The catalyst may have been enclosed or alternatively may be latent such that it will become active only at the time when the temperature is raised.

The tertiary amines or the imidazoles can increase a curing rate, physical properties of a cured product, heat resistance, and the like by being used together with the amine-based curing agent of the epoxy curing agent (D).

The curing accelerator (E) may be used singly or two or more of the same may be used in combination. The amount of the curing accelerator (E) to be used is preferably 0.1 to 10 parts by mass, more preferably 0.2 to 5 parts by mass, even more preferably 0.5 to 3 parts by mass, and particularly preferably 0.8 to 2 parts by mass, relative to 100 parts by mass of the epoxy resin (A). If it is less than 0.1 parts by mass, the curability of the curable resin composition of the present invention may be impaired. If it is more than 10 parts by mass, the storage stability of the curable resin composition of the present invention may be illustrated and may be difficult to handle.

<Calcium Oxide (F)>

In the present invention, calcium oxide (F) may be used according to necessity. The calcium oxide (F) removes water via a reaction with the water contained in the curable resin composition, so that it solves various problems of physical properties caused by the presence of water. For example, it functions as an antifoaming agent by removal of water and inhibits drop of adhesion strength.

Preferably, the calcium oxide (F) has been surface-treated with a surface treatment agent. The surface treatment improves the dispersibility of the calcium oxide (F) in the composition, so that physical properties such as adhesion strength of a cured product to be obtained are improved. The surface treatment agent is not particularly limited, and the surface treatment agent is preferably a fatty acid.

The amount of the calcium oxide (F) to be used is 0.1 to 10 parts by mass, preferably 0.2 to 5 parts by mass, more preferably 0.5 to 3 parts by mass, and particularly preferably 1 to 2 parts by mass, relative to 100 parts by mass of the epoxy resin (A). If it is less than 0.1 parts by mass, the effect of removing water may not be sufficient, and if it is more than 10 parts by mass, the strength of a resulting cured product may be decreased. The calcium oxide (E) may be used singly or two or more of the same may be used in combination.

<Strengthening Agent>

In the present invention, for the purpose of further improving performance such as toughness, impact resistance, shear adhesiveness and peel adhesiveness, a strengthening agent that is different from polymer fine particle (B), the rubber-modified epoxy resin or the urethane-modified epoxy resin may be used as required.

The strengthening agent is not limited particularly, and an example of the strengthening agent is a compound which is a so-called blocked isocyanate that is of an elastomer type, contains a urethane group and/or a urea group and has a terminal isocyanate group or terminal isocyanate groups, in which all or some of the terminal isocyanate groups are capped with any one of various blocking agents each having an active hydrogen group. Particularly, the strengthening agent is preferably a compound in which all of the terminal isocyanate groups are capped with a blocking agent. Such a compound can be produced, for example, by reacting an organic polymer having an active-hydrogen-containing group at a terminal thereof with an excessive amount of a polyisocyanate compound to produce a polymer (a urethane prepolymer) having a urethane group and/or a urea group in the ma n chain thereof and having an isocyanate group or isocyanate groups at a terminal or termini thereof, and subsequently or simultaneously capping all or some of the isocyanate groups with a blocking agent having an active hydrogen group.

Examples of the main chain backbone that constitutes the organic polymer having an active-hydrogen-containing group at a terminal thereof include a polyether polymer, a polyacrylic polymer, a polyester polymer, a polydiene polymer, a saturated hydrocarbon polymer (a polyolefin) and a polythioether polymer.

Examples of the active-hydrogen-containing group that constitutes the organic polymer having an active-hydrogen-containing group at a terminal thereof include a hydroxyl group, an amino group, an imino group and a thiol group. Among these groups, a hydroxyl group, an amino group and an imino group are preferred from the viewpoint of availability, and a hydroxyl group is more preferred from the viewpoint of the easiness of handling (viscosity) of the resultant strengthening agent.

Examples of the organic polymer having an active-hydrogen-containing group at a terminal thereof include a polyether polymer having a hydroxyl group at a terminal thereof (polyether polyol), a polyether polymer having an amino group and/or an imino group at a terminal thereof (polyetheramine), a polyacrylate polyol, a polyester polyol, a diene polymer having a hydroxyl group at a terminal thereof (polydiene polyol), a saturated hydrocarbon polymer having a hydroxyl group at a terminal thereof (a polyolefin polyol), a polythiol compound and a polyamine compound. Among these organic polymers, a polyether polyol, a polyetheramine and a polyacrylate polyol are preferred, because these organic polymers have excellent compatibility with the epoxy resin (A), have relatively low glass transition temperatures and can be cured into cured articles each having excellent impact resistance at lower temperatures. Particularly, a polyether polyol and a polyetheramine are more preferred because these organic polymers have low viscosities and therefore can be handled satisfactorily, and a polyether polyol is particularly preferred.

The organic polymers each having an active-hydrogen-containing group at a terminal thereof, each of which can be used for the preparation of the urethane prepolymer that is a precursor of the strengthening agent, may be used singly, or two or more of them may be used in combination.

The number average molecular weight of the organic polymer having an active-hydrogen-containing group at a terminal thereof is preferably 800 to 7000, more preferably 1500 to 5000, and particularly preferably 2000 to 4000, based on the molecular weight of polystyrene, as measured by GPC.

The polyether polymer is substantially a polymer having a repeating unit represented by general formula (1): —$R^1$—O— (wherein $R^1$ represents a linear or branched alkylene group having 1 to 14 carbon atoms), wherein $R^1$ in general formula (1) is preferably a linear or branched alkylene group having 1 to 14 carbon atoms, more preferably 2 to 4 carbon atoms. Specific examples of the repeating unit represented by general formula (1) include —$CH_2O$—, —$CH_2CH_2O$—, —$CH_2CH(CH_3)O$—, —$CH_2CH(C_2H_5)O$—, —$CH_2C(CH_3)_2O$— and —$CH_2CH_2CH_2CH_2O$—. The main chain backbone of the polyether polymer may be composed of only a single repeating unit, or may be composed of two or more repeating units. Particularly, a polyether polymer which comprises a polymer containing, as the main component, a propylene oxide polymer containing not less than 50% by mass of a propylene oxide repeating unit is preferred, because this type of polyether polymer has a relatively low viscosity. Polytetramethylene glycol (PTMG), which is produced by the ring-opening polymerization of tetrahydrofuran, is also preferred, because the polymer has a low Tg and therefore can exhibit excellent properties at lower temperatures and also has high heat resistance.

The polyether polyol is a polyether polymer having a hydroxyl group at a terminal thereof, and the polyetheramine is a polyether polymer having an amino group or amino group at a terminal thereof.

As the polyacrylate polyol, a polyol which has a (meth) acrylic acid alkyl ester (co)polymer as a backbone and has a hydroxyl group in the molecule can be mentioned. Particularly, a polyacrylate polyol which is produced by the copolymerization of a hydroxyl group-containing (meth) acrylic acid alkyl ester monomer, such as 2-hydroxyethyl methacrylate, is preferred.

Examples of the polyester polyol include polymers each of which is produced by the polycondensation of a polybasic acid (e.g., maleic acid, fumaric acid, adipic acid, phthalic acid) or an acid anhydride thereof with a polyhydric alcohol (e.g., ethylene glycol, propylene glycol, 1,4-butanediol, 1,6-hexanediol, diethylene glycol, dipropylene glycol, neopentyl glycol) at a temperature ranging from 150 to 270° C. in the presence of an esterification catalyst. In addition, ring-opened polymers of ε-caprolactone, valerolactone and the like, and active hydrogen compounds each having at least two active hydrogen atoms, such as polycarbonate diol and castor oil, can also be mentioned as the examples of the polyester polyol.

Examples of the polydiene polyol include polybutadiene polyol, polyisoprene polyol and polychloroprene polyol, and polybutadiene polyol is particularly preferred.

Examples of the polyolefin polyol include polyisobutylene polyol, hydrogenated polybutadiene polyol and the like.

Specific examples of the polyisocyanate compound include an aromatic polyisocyanate such as toluene (tolylene) diisocyanate, diphenylmethane diisocyanate and xylylene diisocyanate; and an aliphatic polyisocyanate such as isophorone diisocyanate, hexamethylene diisocyanate, hydrogenated toluene diisocyanate and hydrogenated diphenylmethane diisocyanate. Among these polyisocyanate compounds, an aliphatic polyisocyanate is preferred from the viewpoint of heat resistance, and isophorone diisocyanate and hexamethylene diisocyanate are more preferred from the viewpoint of availability.

Examples of the blocking agent include a primary amine locking agent, a secondary amine blocking agent, an oxime blocking agent, a lactam blocking agent, an active methylene blocking agent, an alcohol blocking agent, a mercaptan blocking agent, an amide blocking agent, an imide blocking agent, a heterocyclic aromatic compound blocking agent, a hydroxy-functional (meth)acrylate blocking agent and a phenol blocking agent. Among these blocking agents, an oxime blocking agent, a lactam blocking agent, a hydroxy-functional (meth)acrylate blocking agent and a phenol blocking agent are preferred, and a hydroxy-functional (meth)acrylate blocking agent and a phenol blocking agent are more preferred, and a phenol blocking agent is even preferred.

Examples of the primary amine blocking agent include butylamine, isopropylamine, dodecylamine, cyclohexylamine, aniline and benzylamine. Examples of the secondary amine blocking agent include dibutylamine, diisopropylamine, dicyclohexylamine, diphenylamine, dibenzylamine, morpholine and piperidine. Examples of the oxime blocking agent include formaldoxime, acetaldoxime, acetoxime, methyl ethyl ketoxime, diacetyl monoxide and cyclohexane oxime. Examples of the lactam blocking agent include ε-caprolactam, δ-valerolactam, γ-butyrolactam and β-butyrolactam. Examples of the active methylene blocking agent include ethyl acetoacetate and acetylacetone. Examples of the alcohol blocking agent include methanol, ethanol, propanol, isopropanol, butanol, amyl alcohol, cyclohexanol, 1-methoxy-2-propanol, ethylene glycol monomethyl ether, ethylene glycol monoethyl ether, propylene glycol monomethyl ether, benzyl alcohol, methyl glycolate, butyl glycolate, diacetone alcohol, methyl lactate and ethyl lactate. Examples of the mercaptan blocking agent include butyl mercaptan, hexyl mercaptan, decyl mercaptan, t-butyl mercaptan, thiophenol, methylthiophenol and ethylthiophenol. Examples of the amide blocking agent include acetamide and benzamide. Examples of the imide blocking agent include succinimide and maleinimide. Examples of the heterocyclic aromatic compound blocking agent include an imidazole compound such as imidazole and 2-ethylimidazole, a pyrrole compound such as pyrrole, 2-methylpyrrole and 3-methylpyrrole, a pyridine compound such as pyridine, 2-methylpyridine and 4-methylpyridine, and a diazabicycloalkene such as diazabicycloundecene and diazabicyclononene.

The hydroxy-functional (meth)acrylate blocking agent may be a (meth)acrylate having at least one hydroxyl group. Specific examples of the hydroxy-functional (meth)acrylate blocking agent include 2-hydroxyethyl(meth)acrylate, 2-hydroxypropyl(meth)acrylate, 4-hydroxybutyl(meth)acrylate, 2-hydroxybutyl(meth)acrylate and the like.

The phenol blocking agent contains at least one phenolic hydroxyl group, i.e., a hydroxyl group that is directly bound to a carbon atom in an aromatic ring. The phenol blocking agent may have at least two phenolic hydroxyl groups, but preferably contains only one phenolic hydroxyl group. The phenol blocking agent may contain other substituent, and the substituent is preferably one that cannot react with an isocyanate group under capping reaction conditions and is preferably an alkenyl group or an allyl group. Examples of other substituent include an alkyl group such as a linear alkyl group, a branched alkyl group and a cycloalkyl group; an aromatic group (e.g., a phenyl group, an alkyl-substituted phenyl group, an alkenyl-substituted phenyl group); an aryl-substituted alkyl group; and a phenol-substituted alkyl group. Specific examples of the phenol blocking agent include phenol, cresol, xylenol, chlorophenol, ethylphenol, allylphenol (particularly o-allylphenol), resorcinol, catechol, hydroquinone, bisphenol, bisphenol A, bisphenol AP (1,1-bis(4-hydroxylphenyl)-1-phenylethane), bisphenol F, bisphenol K, bisphenol M, tetramethylbiphenol, 2,2'-diallylbisphenol A and the like. It is preferred that the blocking agent is bound to a terminal of the polymer chain in the urethane prepolymer in such a manner that the terminal to which the blocking agent is bound has no reactive group.

The above-mentioned blocking agents may be used singly, or two or more of them may be used in combination. The strengthening agent may contain a residue of a cross-linking agent, a residue of a chain extender or both of the residues. The cross-linking agent preferably has a molecular weight of not more than 750, more preferably 50 to 500, and is a polyol or a polyamine compound each having at least three hydroxyl groups, amino groups and/or imino groups per molecule. The cross-linking agent can impart branches to the strengthening agent, and is therefore useful for increasing the functionality (i.e., the number of capped isocyanate groups per molecule) of the strengthening agent.

The chain extender preferably has a molecular weight of not more than 750, more preferably 50 to 500, and is a polyol or a polyamine compound each having two hydroxyl groups, amino groups and/or imino groups per molecule. The chain extender is useful for increasing the molecular weight of the strengthening agent without increasing the functionality of the strengthening agent.

Specific examples of the cross-linking agent and the chain extender include trimethylolpropane, glycerin, trimethylolethane, ethylene glycol, diethylene glycol, propylene glycol, dipropylene glycol, sucrose, sorbitol, pentaerythritol, ethylenediamine, triethanolamine, monoethanolamine, diethanolamine, piperazine and aminoethylpiperazine. In addition, compounds each having at least two phenolic hydroxyl groups, such as resorcinol, catechol, hydroquinone, bisphenol, bisphenol A, bisphenol AP (1,1-bis(4-hydroxyphenyl)-1-phenylethane), bisphenol F, bisphenol K, bisphenol M, tetramethylbiphenol and 2,2'-diallylbisphenol A, can also be mentioned as the examples of the cross-linking agent and the chain extender.

The strengthening agent is represented by, for example, general formula (2): A-(NR$^2$—C(D)-X)$_a$ (wherein "a" pieces of R$^2$s independently represent a hydrocarbon group having 1 to 20 carbon atoms, wherein "a" represents the average number of capped isocyanate groups per molecule and is preferably not less than 1.1, more preferably 1.5 to 8, still more preferably 1.7 to 6, particularly preferably 2 to 4; X represents a residue produced by removing an active hydrogen atom from the blocking agent; and A represents a residue produced by removing a terminal isocyanate group from an isocyanate-terminated prepolymer).

The number average molecular weight of the strengthening agent is preferably 2000 to 40000, more preferably 3000 to 30000, and particularly preferably 4000 to 20000, based on the molecular weight of polystyrene, as measured by GPC. The molecular weight distribution (i.e., the ratio of the weight average molecular weight to the number average molecular weight) of the strengthening agent is preferably 1 to 4, more preferably 1.2 to 3, and particularly preferably 1.5 to 2.5.

When the strengthening agent is used, the amount of the strengthening agent to be used is preferably 1 to 50 parts by mass, more preferably 5 to 30 parts by mass, and particularly preferably 10 to 20 parts by mass, relative to 100 parts by mass of the epoxy resin (A). If the amount is less than 1 part by mass, the effect of improving toughness, impact resistance, adhesiveness and the like is often insufficient. If the amount is more than 50 parts by mass, the elastic modulus of a cured article produced from the composition is often decreased. The strengthening agents may be used singly, or two or more of them may be used in combination.

<Radically Curable Resin>

In the present invention, a radically curable resin having at least two double bonds in the molecule may be used as required. If necessary, a low-molecular-weight compound having a molecular weight of less than 300 and having at least one double bond in the molecule may also be added. The low-molecular-weight compound can exhibit a function of modulating the viscosity of the composition, the properties of a cured product of the composition and the curing rate of the composition when used in combination with the radically curable resin, and therefore can act as a so-called reactive diluent for the radically curable resin. Furthermore, a radical polymerization initiator may also be added to the resin composition according to the present invention. In this regard, the radical polymerization initiator is preferably one of a latent type which can be activated when the temperature is increased (preferably to about 50° C. to about 150° C.).

Examples of the radically curable resin include an unsaturated polyester resin, polyester (meth)acrylate, epoxy(meth) acrylate, urethane (meth)acrylate, polyether (meth)acrylate, acrylated (meth)acrylate and the like. These radically curable resins May be used singly, or two or more of them may be used in combination. Specific examples of the radically curable resin include those compounds described in a pamphlet of WO 2014/115778. Specific examples of the low-molecular-weight compound and the radical polymerization initiator include those compounds described in a pamphlet of WO 2014/115778.

When the radical polymerization initiator is activated at a temperature different from the curing temperature for the epoxy resin as described in a pamphlet of WO 2010/019539, it becomes possible to partially cure the resin composition through the polymerization selective to the radically curable resin. This partial curing enables the increase in the viscosity of the composition after application of the composition and the improvement in wash-off resistance of the composition. In water-washing shower step in a production line for vehicles and the like, the adhesive agent composition which is not cured yet is often dissolved partially, scattered or deformed by the pressure of the showering water during the water-washing shower step to adversely affect the corrosion resistance of a part of a steel sheet on which the adhesive agent composition is applied or cause the deterioration in stiffness of the steel sheet. The term "wash-off resistance" means the resistance to this problem. The partial curing also enables the impartment of a function of temporarily fixing (temporarily adhering) substrates each other until the completion of the curing of the composition. In this case, it is preferred that the free radical initiator can be activated by heating to 80° C. to 130° C., more preferably 100° C. to 120° C.

<Monoepoxide>

In the present invention, a monoepoxide may be used according to necessity. The monoepoxide may function as a reactive diluent. Specific examples of the monoepoxide include aliphatic glycidyl ethers such as butyl glycidyl ether, or aromatic glycidyl ethers such as phenyl glycidyl ether and cresyl glycidyl ether, ethers composed of an alkyl group having 8 to 10 carbon atoms and a glycidyl group, such as 2-ethylhexyl glycidyl ether, ethers composed of a glycidyl group and a phenyl group having 6 to 12 carbon atoms that may be substituted with an alkyl group having 2 to 8 carbon atoms, such as p-tert-butylphenyl glycidyl ether, ethers composed of an alkyl group having 12 to 14 carbon atom and a glycidyl group, such as dodecyl glycidyl ether; aliphatic glycidyl esters such as glycidyl(meth)acrylate and glycidyl maleate; glycidyl esters of aliphatic carboxylic acids having 8 to 12 carbon atom, such as glycidyl versatate, glycidyl neodecanoate, and glycidyl laurate; and glycidyl p-t-butylbenzoate.

When a monoepoxide is used, its amount to be used is preferably 0.1 to 20 parts by mass, more preferably 0.5 to 10 parts by mass, and particularly preferably 1 to 5 parts by mass, per 100 parts by mass of the epoxy resin (A). If it is less than 0.1 parts by mass, the effect of lowering viscosity may not be sufficient, and if it is more than 20 parts by mass, physical properties such as adhesion properties may deteriorate.

<Photopolymerization Initiator>

When the curable resin composition of the present invention is photo-cured, a photopolymerization initiator may be added thereto. Examples of such a photopolymerization initiator include aromatic sulfonium salts with anions such as hexafluoroantimonate, hexafluorophosphate, and tetraphenyl borate, onium salts such as aromatic iodonium salts, and photocationic polymerization initiators (photoacid generators) such as aromatic diazonium salts and metallocene salts. Such photopolymerization initiators may be used singly or two or more of the same may be used in combination.

<Other Components>

In the present invention, other components may be used according to necessity. Examples of such other components include expanding agents such as azo-type chemical foaming agents and thermally expandable microballoons, fiber pulps such as aramid pulp, coloring agents, such as pigments and dyes, extender pigments, UV absorbers, antioxidants, stabilizers (anti-gelling agents), plasticizers, leveling agents, defoaming agents, silane coupling agents, antistatic agents, flame retardants, lubricants, thinners, low profile additives, organic fillers, thermoplastic resins, desiccants, and dispersing agents.

<Method for Preparing Curable Resin Composition>

The curable resin composition of the present invention is a composition containing polymer fine particles (B) in the curable resin composition containing the epoxy resin (A) as a main component. The curable resin composition is preferably a composition in which the polymer fine particles (B) are dispersed at the state of primary particle.

Various methods can be used as a method of obtaining a composition in which polymer fine particles (B) are dispersed in the state of primary particles in the epoxy resin (A). For example, such a method includes a method of bringing polymer fine particles obtained in the state of an aqueous latex, into contact with the epoxy resin (A) and then removing unnecessary components such as water and the like, and a method of once extracting polymer fine particles with an organic solvent and then mixing the extract with the epoxy resin (A) to remove the organic solvent. However, it is preferred to use the method described in International Publication WO 2005/028546. Specifically, such a method includes a first step of mixing an aqueous latex containing polymer fine particles (B) (in particular, a reaction mixture after production of the polymer fine particles by emulsion polymerization) with an organic solvent having a solubility of 5% by mass or more and 40% by mass or less in water at 20° C. and further mixing the mixture with an excess of water to agglomerate the polymer fine particles; a second step of separating and collecting the agglomerated polymer fine particles (B) from the liquid phase and mixing the polymer fine particles with an organic solvent again to obtain an organic solvent solution containing the polymer fine particles (B); and a third step of further mixing the organic solvent solution with the epoxy resin (A) and then distilling off the organic solvent, and this method is preferably used for the preparation of the composition. The epoxy resin (A) is preferably a liquid at 23° C. because the third step is easily performed. The term "liquid at 23° C." means that the softening point is 23° C. or less and means that the epoxy resin (A) has a fluidity at 23° C.

By additionally mixing the epoxy resin (A), the inorganic filler (C), epoxy curing agent (D), and curing accelerator (E) and the above-described other components according to necessity with the composition obtained via the above-described steps in which the polymer fine particles (B) are dispersed in a primary particle state in the epoxy resin (A), a curable resin composition of the present invention in which the polymer fine particles (B) are dispersed in a primary particle state is obtained.

On the other hand, powdery polymer fine particles (B) obtained by drying after coagulation by such a method as salting-out can be re-dispersed in the epoxy resin (A) by using a disperser having high mechanical shearing force, such as a three-roll paint mill, a roll mill, and a kneader. In this case, the epoxy resin (A) and the polymer fine particle (B) render the dispersion of the polymer fine particle (B) possible efficiently by being given a mechanical shearing force at high temperatures. The temperature at which the dispersion is performed is preferably 50 to 200° C., more preferably 70 to 170° C., even more preferably 80 to 150° C., and particularly preferably 90 to 120° C. If the temperature is lower than 50° C., the polymer fine particle (B) may not be sufficiently dispersed, and if the temperature is higher than 200° C., the epoxy resin (A) and the polymer fine particle (B) may be thermally degraded.

The curable resin composition of the present invention can be used in the form of a one-pack type curable resin composition that is sealed and stored after mixing all components in advance, and is cured by heating or light irradiation after application thereof. It is also allowed to prepare a two-pack or multi-pack curable resin composition composed of a liquid A containing the epoxy resin (A) as the major component, the polymer fine particle (B), and according to necessity, the inorganic filler (C), and a separately prepared liquid B containing the epoxy curing agent (D), the curing accelerator (B), and according to necessity, the polymer fine particle (B) and/or the inorganic filler (C), and to mix the liquid A and the liquid B before use and then use the mixture. Since the curable composition of the present invention excels in storage stability, it is particularly beneficial when it is used as a one-pack type curable resin composition.

The polymer fine particle (B) and the inorganic filler (C) are just required to be contained in at least one of the liquid A and the liquid B: for example, they may be contained only in the liquid A or only in the liquid B or they may be contained in both the liquid A and the liquid B.

<Cured Product>

In the present invention, a cured product produced by curing the resin composition is included. In the case of a curable resin composition in which polymer fine particles are dispersed in the form of primary particles, a cured product in which the polymer fine particles are dispersed homogeneously can be produced readily by curing the resin composition. In this case, since the polymer fine particles are hardly swelled and the viscosity of the resin composition is low, the cured product can be produced with good workability.

<Method for Application>

The curable resin composition according to the present invention can be applied by any method. The resin composition can be applied at a temperature as low as room temperature, and can also be applied while being heated if necessary. The curable resin composition of the present invention is particularly useful for methods of coating the composition with heating the composition due to excellent storage stability.

The curable resin composition according to the present invention may be extruded in a bead-like, monofilament-like or swirl-like form on a substrate using an application robot, or may be applied employing a mechanical application method using a caulking gun or the like or other manual application means. Alternatively, the composition may be applied onto a substrate by a jet spray method or a streaming method. The curable resin composition according to the present invention is applied onto one or both of two substrates and the substrates are brought into contact with each other in such a manner that the composition is arranged between the substrates to be bonded each other, and then the resin composition is cured to bond the substrates each other. The viscosity of the curable resin composition is not particularly limited, and the viscosity of the curable resin composition in the extruded bead method is preferably 150 to 600 Pa·s at 45° C., and the a viscosity of the curable resin composition in the swirl coating method is preferably 100 Pa·s at 45° C., and the viscosity of the curable resin composition in method for coating the composition at high volume using the high speed flow device is preferably 20 to 400 Pa·s at 45° C.

When it is intended to use the curable resin composition according to the present invention as an adhesive for vehicle, for the purpose of improving the above-mentioned "wash-off resistance", it is effective to increase the viscosity of the composition. The resin composition according to the present invention is preferred, because the resin composition has high thixotropic properties and therefore tends to have a high viscosity. The viscosity of the highly viscous composition can be adjusted to a value at which the composition can be applied by heating.

Furthermore, for the purpose of improving the "wash-off resistance," it is preferred to add to the composition a polymeric compound having a crystalline melting point around a temperature at which the curable composition according to the present invention is to be applied, as described in a pamphlet of WO 2005/118734. The viscosity of the composition is low (easy to apply) at a temperature at which the composition is to be applied, and is high at a temperature at which the water-washing shower step is to be carried out, and therefore the "wash-off resistance" of the composition is improved. Examples of the polymeric compound having a crystalline melting point around a temperature at which the composition is to be applied include various polyester resins including a crystalline or semi-crystalline polyester polyol.

In addition, as another method for improving the "wash-off resistance" of the composition, a method can be mentioned, in which the resin composition is prepared in the form of a two-pack preparation, a curing agent capable of curing at room temperature (e.g., an amine curing agent having an amino group or arylamido group) is used in a small amount as the curing agent, and a latent curing agent that can exhibit the activity thereof at a higher temperature (e.g., dicyandiamide) is also used in combination, as described in a pamphlet of WO 2006/093949. When at least two types of curing agents having greatly different curing temperatures are used in combination, the partial curing of the composition proceeds immediately after the application of the composition, and the viscosity of the composition becomes high at a time at which the waterwashing shower step is carried out, thereby improving the "wash-off resistance" of the composition.

<Substrate to be Adhered>

When is intended to bond various types of substrates each other using the resin composition according to the present invention, for example, woody materials, metals, plastic materials, and glass materials can be bonded. The bonding of automotive parts to each other is preferred, and the bonding of automotive frames to each other and the bonding of an automotive frame to another automotive part is more preferred. Examples of the substrate include steel materials including cold-rolling steel and hot-dip zinc-coated steel, aluminum materials including aluminum and coated aluminum, and various types of plastic substrates including a general-purpose plastic, engineering plastic and a composite material such as CFRP, GFRP, and the like.

The curable resin composition according to the present invention has excellent toughness, and therefore is suitable for the bonding of different base materials having different linear expansion coefficients to each other. The curable resin composition according to the present invention can also be used for the bonding of aerospace constituent materials to each other, particularly the bonding of exterior metallic constituent materials to each other.

<Curing Temperature>

The curing temperature for the curable resin composition according to the present invention is not limited particularly. When the resin composition is used as a one-pack resin composition, the curing temperature is preferably 50° C. to 250° C., more preferably 80° C. to 220° C., still more preferably 100° C. to 200° C., and particularly preferably 130° C. to 180° C. When the resin composition is used as a two-pack resin composition, the curing temperature is not particularly limited, and is preferably 0° C. to 150° C., more preferably 10° C. to 100° C., even preferably 15° C. to 80° C., and particular) preferably 20° C. to 60° C.

When the curable resin composition according to the present invention is used as an adhesive for automobiles, it is preferred to apply the adhesive to an automotive member, then apply a coating material onto the automotive member, and then cure the adhesive simultaneously with the baking/curing of the coating material, from the viewpoint of the shortening and simplification of the process.

<Use Applications>

The curable resin composition of the present invention is preferably one-pack curable resin composition in the viewpoint of the handling.

The resin composition according to the present invention can be used suitably as a structural adhesive for vehicle and aerospace structures, an adhesive for wind power-generating structures, a paint, a laminate material using glass fiber, a material for printed wiring substrates, a solder resist, an interlayer insulating film, a build-up material, an adhesive for FPCs, an electrically insulating material including a sealing material for electronic components such as semiconductors and LEDs, a die bonding material, an underfill, a semiconductor packaging material for ACF, ACP, NCF, NCP and the like, a sealing material such as a sealing material for display devices and lighting devices including a liquid crystal panel, an OLED lighting devices and an OLED display. Particularly, the curable resin composition of the present invention is useful for the structural adhesive for vehicle.

The present application claims the benefits of priorities to Japanese Patent Application Number 2013-223833 filed on Oct. 29, 2013 and Japanese Patent Application Number 2014-169859 filed on Aug. 22, 2014. The entire contents of the specifications of Japanese Patent. Application Number 2013-223833 filed on Oct. 29, 2013 and Japanese Patent Application Number 2014-169859 filed on Aug. 22, 2014 are hereby incorporated by reference.

EXAMPLES

Next, the present invention will be described in detail with reference to Examples and Comparative Examples, but the present invention is not limited thereto, and the variation and the modification of the present invention without departing the gist described above and below are all included the technical scope of the present invention the following Examples and Comparative Examples, "part(s)" and "%" mean "part(s) by mass" and "% by mass", respectively.
Evaluation Method
First, the evaluation method of the curable resin composition produced by Examples and Comparative Examples will be described below.
[1] Measurement of Volume Average Particle Diameter
The volume average particle diameters (Mv) of the polymer fine particles dispersing in the aqueous latex were determined using Microtrac UPA 150 (manufactured by Nikkiso Co., Ltd.). A solution prepared by diluting the aqueous latex with deionized water was used as a measurement sample. The measurement was carried out in such a manner that the refractive index of water and the refractive index of each of rubber particles or a core-shell polymer were input, the time of measurement was 600 seconds, and the concentration of the sample was adjusted so that the signal level fell within the range from 0.6 to 0.8.
[2] Measurement of Viscosity
The viscosity of the curable resin composition was measured using a digital viscometer model DV-II+Pro (a product by Brookfield Engineering Laboratories, Inc.). A spindle CPE-52 was used, and the viscosity was measured at a measurement temperature of 23° C.
1. Formation of Core Layer Production Example 1-1; Preparation or Polybutadiene Rubber Latex (R-1)

Into a 100-L pressure resistant polymerization reactor, 200 parts by mass of deionized water, 0.03 parts by mass of tripotassium phosphate, 0.25 parts by mass of potassium dihydrogen phosphate, 0.002 parts by mass of disodium ethylenediaminetetraacetate (EDTA), 0.001 parts by mass of ferrous sulfate heptahydrate (FE) and 1.5 parts by mass of sodium dodecylbenzenesulfonate (SDS) were charged, and stirred while sufficient nitrogen purge was performed to remove oxygen. Then, 100 parts by mass of butadiene (ED) was fed to the system, and the mixture was heated to 45° C. To this, 0.015 parts by mass of paramenthane hydroperoxide (PHP) and subsequently 0.04 parts by mass of sodium formaldehyde sulfoxylate (SFS) were added to initiate polymerization. Additionally, 0.01 parts by mass of PHP, 0.0015 parts by mass of EDTA, and 0.001 parts by mass of FE were charged at the time of 4 hours from the start of the polymerization. At the time of 10 hours from the start of the polymerization, remaining monomers were distilled off and removed under reduced pressure to stop the polymerization, so that a latex (R-1) containing polybutadiene rubber particles was obtained. The volume average particle diameter of the polybutadiene rubber particles contained in the resulting latex was 0.10 µm.

Production Example 1-2; Preparation of Polybutadiene Rubber Latex (R-2)

Into a 100-L pressure resistant polymerization reactor, 21 parts by mass of the polybutadiene rubber latex (R-1) (containing 7 parts by mass of polybutadiene rubber) prepared in Production Example 1-1, 185 parts by mass of deionized water, 0.03 parts by mass of tripotassium phosphate, 0.002 parts by mass of EDTA, 0.001 parts by mass of ferrous sulfate heptahydrate were charged, and stirred while sufficient nitrogen purge was performed to remove oxygen. Then, 93 parts by mass of butadiene (ED) was fed to the system, and the mixture was heated to 45° C. To this, 0.02 parts by mass of PHP and subsequently 0.10 parts by mass of SFS were added to initiate polymerization. Additionally, 0.025 parts by mass of PHP, 0.0006 parts by mass of EDTA, and 0.003 parts by mass of FE were charged at the time of every 3 hours from the start of the polymerization to 24 hours. At the time of 30 hours from the start of the polymerization, remaining monomers were distilled off and removed under reduced pressure to stop the polymerization, so that a latex (R-2) containing polybutadiene rubber particles as a main component was obtained. The volume average particle diameter of the polybutadiene rubber particles contained in the resulting latex was 0.20 µm.

Production Example 1-3; Preparation of Polyorganosiloxane Rubber Latex (R-3))

A mixture of 200 parts by mass of deionized water, 1.0 part by mass of SDS, 1.0 part by mass of dodecylbenzenesulfonic acid, 97.5 parts by mass of hydroxy-terminated polydimethylsiloxane having an average molecular weight of 2000 and 2.5 parts by mass of γ-methacryloxypropylmethyldimethoxysilane was stirred with a homomixer at 10000 rpm for 5 minutes, and the resultant product was allowed to pass through a high-pressure homogenizer three times under a pressure of 500 bar to prepare a siloxane emulsion. The emulsion was rapidly charged in a lump into a glass reactor equipped with a thermometer, a stirrer, a reflux condenser, a nitrogen inlet and an apparatus for adding auxiliary raw materials including monomers and an emulsifying agent. The reaction was initiated at 30° C. while stirring the system. After 6 hours, the system was cooled to 23° C. and then left for 20 hours, and the pH value of the system was adjusted to 6.8 with sodium hydrogen carbonate, and the polymerization was terminated, thereby producing a latex (R-3) which contained polyorganosiloxane rubber particles. The polyorganosiloxane rubber particles contained in the latex had a volume average particle diameter of 0.28 µm.

Production Example 2-4; Preparation of Acrylic Rubber Latex (R-4)

Into a glass reactor equipped with a thermometer, a stirrer, a reflux condenser, a nitrogen inlet and an apparatus for adding monomers and an emulsifying agent were charged 180 parts by mass of deionized water, 0.002 parts by mass of EDTA, 0.001 parts by mass of Fe, 0.04 parts by mass of SFS and 0.5 parts by mass of SDS. Subsequently, the system was heated to 45° C. while stirring in a nitrogen gas stream. Subsequently, a mixture of 98 parts by mass of n-butyl acrylate (BA), parts by mass of allyl methacrylate (ALMA) and 0.02 parts by mass of cumene hydroperoxide (CHP) was added dropwise to the system over 3 hours. Simultaneously with the addition of the monomer mixture, an aqueous 5 mass % SDS solution prepared using 1 part by mass of SDS was also added continuously over 3 hours. The stirring of the system was continued for 1 hour after the completion of the addition of the monomer mixture to complete the polymerization, thereby producing a latex (R-4) which contained acrylic rubber particles. The acrylic rubber particles contained in the latex had a volume average particle diameter of 0.09 μm.

2. Preparation of Polymer Fine Particles (Formation of Shell Layer)

Production Example 2-1; Preparation of Core-Shell Polymer Latex (L-1)

Into a 3-L glass container, 1575 parts by mass of the latex (R-1) obtained in Production Example 1-1 (corresponding to 510 parts by mass of polybutadiene rubber particles) and 315 parts by mass of deionized water were charged, and stirred at 60° C. while nitrogen purge was performed. After 0.024 parts by mass of EDTA, 0.006 parts by mass of FE, and 1.2 parts by mass of SFS were added, graft polymerization was performed by adding a mixture of a graft monomer (30 parts by mass of styrene (ST), 20 parts by mass of acrylonitrile (AN), 5 parts by mass of glycidyl methacrylate (GMA), and parts by mass of methyl methacrylate (MMA)) and 0.3 parts by mass of cumene hydroperoxide (CHP) continuously over 2 hours. After the completion of the addition, the mixture was further stirred for 2 hours to complete the reaction and a latex (L-1) of a core-shell polymer (B-1) was obtained. The volume average particle diameter of the core-shell polymer contained in the resulting latex was 0.11 μm.

Production Example 2-2: Preparation of Core-Shell Polymer Latex (L-2)

The same procedure as in Production Example 2-1 was carried out, except that 30 parts by mass of styrene (St), 20 parts by mass of acrylonitrile (AN), 10 parts by mass of glycidyl methacrylate (GMA), and 30 parts by mass of methyl methacrylate (MMA) were used in place of 30 parts by mass of styrene (St), 20 parts by mass of acrylonitrile (AN), 5 parts by mass of glycidyl methacrylate (GMA), and 35 parts by mass of methyl methacrylate (MMA). In this manner, core-shell polymer (B-2)-containing aqueous latex (L-2) was produced. The core-shell polymer contained in the aqueous latex had a volume average particle diameter of 0.11 μm.

Production Example 2-3: Preparation of Core-Shell Polymer Latex (L-3)

The same procedure as in Production Example 2-1 was carried out, except that 30 parts by mass of styrene (St), 20 parts by mass of acrylonitrile (AN), 20 parts by mass of glycidyl methacrylate (GMA), and 20 parts by mass of methyl methacrylate (MMA) were used in place of 30 parts by mass of styrene (St), 20 parts by mass of acrylonitrile (AN), 5 parts by mass of glycidyl methacrylate (GMA), and 35 parts by mass of methyl methacrylate (MMA). In this manner, core-shell polymer (B-3)-containing aqueous latex (L-3) was produced. The core-shell polymer contained in the aqueous latex had a volume average particle diameter of 0.11 μm.

Production Example 2-4: Preparation of Core-Shell Polymer Latex (L-4)

The same procedure as in Production Example 2-1 was carried out, except that 30 parts by mass of styrene (St), 20 parts by moss of acrylonitrile (AN), 40 parts by mass of glycidyl methacrylate (GMA), and 0 parts by mass of methyl methacrylate (MMA) were used in place of 30 parts by mass of styrene (St), 20 parts by mass of acrylonitrile (AN), 5 parts by mass of glycidyl methacrylate (GMA), and 35 parts by mass of methyl methacrylate (MMA). In this manner, core-shell polymer (B-4)-containing aqueous latex (L-4) was produced. The core-shell polymer contained in the aqueous latex had a volume average particle diameter of 0.11 μm.

Production Example 2-5: Preparation of Core-Shell Polymer Latex (L-5)

The same procedure as in Production Example 2-1 was carried out, except that 30 parts by mass of styrene (St), 20 parts by mass of acrylonitrile (AN), 0 parts by mass of glycidyl methacrylate (GMA), and 40 parts by mass of methyl methacrylate (MMA) were used in place of 30 parts by mass of styrene (St), 20 parts by mass of acrylonitrile (AN), 5 parts by mass of glycidyl methacrylate (GMA), and 35 parts by mass of methyl methacrylate (MMA). In this manner, core-shell polymer (B-5)-containing aqueous latex (L-5) was produced. The core-shell polymer contained in the aqueous latex had a volume average particle diameter of 0.11 μm.

Production Example 2-6: Preparation of Core-Shell Polymer Latex (L-6)

The same procedure as in Production Example 2-1 was carried out, except that 3 parts by mass of styrene (St), 12 parts by mass of glycidyl methacrylate (GMA), and 75 parts by mass of methyl methacrylate (MMA) were used in place of 30 parts by mass of styrene (St), 20 parts by mass of acrylonitrile (AN), 5 parts by mass of glycidyl methacrylate (GMA), and 35 parts by mass of methyl methacrylate (MMA). In this manner, core-shell polymer (B-6)-containing aqueous latex (L-6) was produced. The core-shell polymer contained in the aqueous latex had a volume average particle diameter of 0.11 μm.

Production Example 2-7: Preparation of Core-Shell Polymer Latex (L-7)

Into a 3-L glass container, 1575 parts by mass of the latex (R-2) obtained in Production Example 1-2 (corresponding to 510 parts by mass of polybutadiene rubber particles) and 315 parts by mass of deionized water were charged, and stirred at 60° C. while nitrogen purge was performed. After 0.024 parts by mass of EDTA, 0.006 parts by mass of FE, and 1.2 parts by mass of SFS were added, graft polymerization was performed by adding a mixture of a graft monomer (42 parts by mass of styrene (ST), 15 parts by mass of acrylonitrile (AN), 6 parts by mass or glycidyl methacrylate (GMA), and 27 parts by mass of methyl methacrylate (MMA)) and 0.3 parts by mass of cumene hydroperoxide (CHP) continuously over 2 hours. After the completion of the addition, the mixture was further stirred for 2 hours to complete the reaction and a latex (L-7) of a core-shell polymer (B-7) was obtained. The volume average particle diameter of the core-shell polymer contained in the resulting latex was 0.21 μm.

Production Example 2-8: Preparation of Core-Shell Polymer Latex (L-8)

Into a glass reactor equipped with a thermometer, a stirrer, a reflux condenser, a nitrogen inlet and an apparatus for adding monomers were charged 250 parts by mass of the polyorganosiloxane rubber latex (R-3) produced in Production Example 1-3 (which contained 83 parts by mass of polyorganosiloxane rubber particles) and 65 parts by mass of deionized water. The system was stirred at 60° C. while being purged with nitrogen. Subsequently, 0.004 parts by mass of EDTA, 0.001 parts by mass of ferrous sulfate heptahydrate and 0.2 parts b by mass of SFS were added, then 2 parts by mass of triallylisocyanurate (TALC) and 0.07 parts by mass of CHP were further added, and the resultant product was stirred for 60 minutes. Subsequently, a mixture of 7 parts by mass of styrene (ST), 4 parts by mass of acrylonitrile (AN), 1 part by mass of glycidyl methacrylate (GMA) and 5 parts by mass of methyl methacrylate (MMA), and 0.05 parts by mass of CHP was continuously added over 110 minutes. After the completion of the addition, 0.065 parts by mass of CHP was added, and the stirring was further continued for 1 hour to complete the polymerization, thereby producing a core-shell polymer (B-8)-containing aqueous latex (L-8). The polymerization conversion rate of each of the monomer components was not less than 99%. The core-shell polymer contained in the aqueous latex had a volume average particle diameter of 0.30 µm.

Production Example 2-9: Preparation of Core-Shell Polymer Latex (L-9)

Into a glass reactor equipped with a thermometer, a stirrer, a reflux condenser, a nitrogen inlet and an apparatus for adding monomers were charged 250 parts by mass of the acrylic rubber latex (R-4) produced in Production Example 1-4 (which contained 83 parts by mass of acrylic rubber particles), and 65 parts by mass of deionized water. The system was stirred at 60° C. while being purged with nitrogen. To the system were added 0.004 parts by mass of EDTA, 0.001 parts by mass of ferrous sulfate heptahydrate and 0.2 parts by mass of SFS. Subsequently, a mixture of 7 parts by mass of styrene (ST), 4 parts by mass of acrylonitrile (AN), 1 part by mass of glycidyl methacrylate (GMA) and 5 parts by mass of methyl methacrylate (MMA), and 0.08 parts by mass of CHP was continuously added over 110 minutes. After the completion of the addition, 0.04 parts by mass of CHP was added, and the stirring was further continued for 1 hour to complete the polymerization, thereby producing a core-shell polymer (B-9)-containing aqueous latex (L-9). The polymerization conversion rate of the monomer components was not less than 99%. The core-shell polymer contained in the aqueous latex had a volume average particle diameter of 0.11 µm.

3. Preparation of Dispersion (M) in which Polymer Fine Particles (B) are Dispersed in Curable Resin Production Examples 3-1 to 3-9; Preparation of Dispersions (M-1 to M-9)

Into a 1-L stirring tank kept at 25° C., 132 g of methyl ethyl ketone (MEK) was charged, and then 132 g (corresponding to 40 g of polymer fine particles) of the aqueous latex (L-1 to L-9) of the core-shell polymer (B-1 to B-9) obtained in the above-described Production Examples 2-1 to 2-9 was also charged under stirring. After mixing uniformly, 200 g of water was added at a feeding rate of 80 g/min. Immediately after the completion of the addition, stirring was stopped and thus a slurry composed of buoyant aggregates and an aqueous phase containing an organic solvent was obtained. Subsequently, 360 g of the aqueous phase was discharge through a discharge port at a lower portion of the tank while the aggregates containing some aqueous phase were left. To the resulting aggregates, 90 g of MEK was added and mixed uniformly to obtain a dispersion in which a core-shell polymer was dispersed uniformly. To this dispersion was mixed 80 g of an epoxy resin (A-1: produced by Mitsubishi Chemical Corporation, JER 828EL: liquid bisphenol A-type epoxy resin) as an epoxy resin (A). MEK was removed from the mixture by using a rotary evaporator. Thus, a dispersion (M-1 to M-9) in which polymer fine particles were dispersed in an epoxy resin was obtained.

Examples 1 to 7, Comparative Examples 1 to 8

According to the recipe given in Table 1, an epoxy resin (A-1) ("JER 828EL" produced by Mitsubishi Chemical Corporation: liquid bisphenol A-type epoxy resin) as an epoxy resin (1), a dispersion (M-1 to M-7) obtained in the above-described Production Examples 3-1 to 3-7, inorganic fillers, a reactive diluent, an epoxy curing agent as a component (D), and a curing accelerator as a component (E) were weighed and mixed well, and thus a curable resin composition was obtained, respectively.

<Thixotropy and Storage Stability>

The viscosity of the curable resin composition at shear rates of 2 s$^{-1}$ and 10 s$^{-1}$ was measured before and after storing it for 14 days at 40° C. Thixotropy was evaluated from "the viscosity at 2 s$^{-1}$ before storage/the viscosity at 10 s$^{-1}$ before storage." The larger this value, the better the thixotropy. As storage stability, a value of "the viscosity at 2 s$^{-1}$ after storage with the viscosity at 2 s$^{-1}$ before storage being taken as 100" was measured. The larger this value, the poorer the storage stability. The test results are shown in Table 1.

<T-Peel Adhesion Strength>

A curable resin composition was applied to two SPCC steel plates having dimensions of 25 mm×200 mm×0.5 mm, the plates were stacked to have an adhesive layer thickness of 0.25 mm, followed by curing at 125° C. for 2 hours, and then T-peel adhesion strength was measured according to JIS K6854. The test results are shown in Table 1.

<Dynamic Resistance to Cleavage (Impact and Peel-Resistant Adhesion)>

A curable resin composition was applied to two SPCC steel plates, the plates were stacked to have an adhesive layer thickness of 0.25 mm, followed by curing at 170° C. for 1 hour, and then dynamic resistance to cleavage at 23° C. was measured according to ISO 11343. The test results are shown in Table 1.

Additionally, the following components were used as each of compounding agents given in Table 1.
<Inorganic Filler>
<<Fumed Silica (C)>>
Aerosil R202 (produced by Evonik industries AG, fumed silica surface-treated with polydimethylsiloxane, average particle diameter: 14 nm, specific surface area: 100 m$^2$/g),
HDK H18 (produced by Wacker Chemie AG, fumed silica surface-treated with polydimethylsiloxane, specific surface area: 120 m$^2$/g),
Aerosil 8972 (produced by Evonik Industries AG, fumed silica surface-treated with dimethyldichlorosilane, average particle diameter: 16 nm, specific surface area: 110 m$^2$/g),
Aerosil 130 (produced by Evonik Industries AG, untreated fumed silica, average particle diameter: 16 nm, specific surface area: 130 m$^2$/g), <<Crystalline Silica>>
CRYSTALITE 5X (produced by Tatsumori Ltd., average particle diameter: 1 μm)
<<Fused Silica>>
FUSELEX E1 (produced by Tatsumori Ltd., average particle diameter: 11 μm)
<<Colloidal Calcium Carbonate>>
HAKUENKA CCR (produced by Shiraishi Kogyo Kaisha, Ltd., colloidal calcium carbonate surface-treated with a saturated fatty acid, average particle diameter: 80 nm)
<<Ground Calcium Carbonate>>
WHITON SB Red (produced by Shiraishi Calcium Kaisha, Ltd., untreated ground calcium carbonate, average particle diameter: 1.8 μm)
<<Calcium (F)>>
CML#31 (produced by Ohmi Chemical Industry Co., Ltd., calcium oxide surface-treated with a fatty acid)

<<Carbon Black>>
MONARCH 280 (produced by Cabot Corporation)
<Reactive Diluent>
Cardula E10P (produced by Momentive Specialty Chemicals Inc., glycidyl versatate)
<Curing Accelerator (E)>
The curing accelerator (E-1) in Table 1 was prepared by the following method.
Maruka Lyncur M Grade S-2 (produced by Maruzen Petrochemical Co., Ltd., polyparavinylphenol) in an amount of 600 g was dissolved in 1050 ml of methanol, and 660 g of 2,4,6-tris(dimethylaminomethyl)phenol was added and stirred well for 30 minutes. Then, a material obtained by grinding with a mortar a solid obtained by distilling off methanol in the mixture with a vacuum pump was used as a curing accelerator (E-1).

TABLE 1

| Composition (part(s) by mass or % by mass) | | | Example 1 | Example 2 | Example 3 | Example 4 | Example 5 | Example 6 | Example 7 | Comparative Example 1 |
|---|---|---|---|---|---|---|---|---|---|---|
| Epoxy resin (A) | Bisphenol A epoxy resin | A-1 (JER828EL) | 40 parts | 40 parts | 40 parts | 40 parts | 40 parts | 40 parts | 40 parts | 100 parts |
| | Rubber-modified epoxy resin | EPON58005 | | | | | | | | |
| | Rubber-modified epoxy resin | EPON58006 | | | | | | | | |
| | Urethane-modified epoxy resin | EPU-73B | | | | | | | | |
| Dispersion of polymer fine particle (M) | Kind of dispersion (M) (compounded amount) | | M-1 (90 parts) | M-2 (90 parts) | M-2 (90 parts) | M-1 (90 parts) | M-1 (90 parts) | M-6 (90 parts) | M-7 (90 parts) | |
| | Amount of polymer fine particle (B) | | 30 parts | 30 parts | 30 parts | 30 parts | 30 parts | 30 parts | 30 parts | |
| | Amount of epoxy resin A-1 | | 60 parts | 60 parts | 60 parts | 60 parts | 60 parts | 60 parts | 60 parts | |
| Amount of epoxy group of polymer fine particle (mmol/g) | | | 0.06 | 0.12 | 0.12 | 0.06 | 0.06 | 0.14 | 0.07 | |
| Fumed silica(C) | Aerosil R202 | | 3 parts | 3 parts | | | | 3 parts | 3 parts | 3 parts |
| | HDK H18 | | | | 3 parts | | | | | |
| | Aerosil R972 | | | | | 3 parts | | | | |
| | Aerosil 130 | | | | | | 3 parts | | | |
| | TS-720 | | | | | | | | | |
| Crystalline silica | CRYSTALITE 5X | | | | | | | | | |
| Fused silica | FUSELEX E1 | | | | | | | | | |
| Colloidal calcium carbonate | HAKUENKA CCR | | | | | | | | | |
| Ground calcium carbonate | WHITON SB | | 15 parts | 15 parts | 15 parts | 15 parts | 15 parts | 15 parts | 15 parts | 15 parts |
| Calcium oxide(F) | CML #35 | | | | | | | | | |
| | CML #31 | | 5 parts | 5 parts | 5 parts | 5 parts | 5 parts | 5 parts | 5 parts | 5 parts |
| Carbon black | MONARCH 280 | | 0.3 parts | 0.3 parts | 0.3 parts | 0.3 parts | 0.3 parts | 0.3 parts | 0.3 parts | 0.3 parts |
| Reactive diluent | Cardura E10P | | 10 parts | 10 parts | 10 parts | 10 parts | 10 parts | 10 parts | 10 parts | 10 parts |
| Epoxy curing agent(D) | dicyanamide | | 7 parts | 7 parts | 7 parts | 7 parts | 7 parts | 7 parts | 7 parts | 7 parts |
| Curing accelerator(E) | E-1 | | 2 parts | 2 parts | 2 parts | 2 parts | 2 parts | 2 parts | 2 parts | 2 parts |
| | Ancamine 2014FG | | | | | | | | | |
| | Dyhard UR300 | | | | | | | | | |
| Amount of (B) relative to 100 parts of (A) | | | 30 parts | 30 parts | 30 parts | 30 parts | 30 parts | 30 parts | 30 parts | — |
| Amount of (C) relative to 100 parts of (A) | | | 3 parts | 3 parts | 3 parts | 3 parts | 3 parts | 3 parts | 3 parts | 3 parts |
| Amount of (D) relative to 100 parts of (A) | | | 7 parts | 7 parts | 7 parts | 7 parts | 7 parts | 7 parts | 7 parts | 7 parts |
| Amount of (E) relative to 100 parts of (A) | | | 2 parts | 2 parts | 2 parts | 2 parts | 2 parts | 2 parts | 2 parts | 2 parts |
| Amount of (F) relative to 100 parts of (A) | | | 5 parts | 5 parts | 5 parts | 5 parts | 5 parts | 5 parts | 5 parts | 5 parts |
| Thixotropy | | | 1.4 | 1.4 | 1.4 | 1.2 | 1.5 | 1.3 | 1.5 | 2.1 |
| Storage stability | | | 119 | 121 | 120 | 114 | 117 | 124 | 122 | 107 |
| T peel adhesive strength (N/25 mm) | | | 173 | 171 | 172 | 167 | 175 | 167 | 169 | 10 |
| Dynamic resistance to cleavage (kN/m) | | | 25 | 26 | 25 | 24 | 25 | 27 | 26 | 0 |

TABLE 1-continued

| Composition (part(s) by mass or % by mass) | | | Comparative Example | | | | | | |
|---|---|---|---|---|---|---|---|---|---|
| | | | 2 | 3 | 4 | 5 | 6 | 7 | 8 |
| Epoxy resin (A) | Bisphenol A epoxy resin | A-1 (JER828EL) | 40 parts | 40 parts | 40 parts | 40 parts | 40 parts | 40 parts | 40 parts |
| | Rubber-modified epoxy resin | EPON58005 | | | | | | | |
| | Rubber-modified epoxy resin | EPON58006 | | | | | | | |
| | Urethane-modified epoxy resin | EPU-73B | | | | | | | |
| Dispersion of polymer fine particle (M) | Kind of dispersion (M) (compounded amount) | | M-3 (90 parts) | M-4 (90 parts) | M-5 (90 parts) | M-1 (90 parts) | M-1 (90 parts) | M-1 (90 parts) | M-1 (90 parts) |
| | Amount of polymer fine particle (B) | | 30 parts | 30 parts | 30 parts | 30 parts | 30 parts | 30 parts | 30 parts |
| | Amount of epoxy resin A-1 | | 60 parts | 60 parts | 60 parts | 60 parts | 60 parts | 60 parts | 60 parts |
| Amount of epoxy group of polymer fine particle (mmol/g) | | | 0.23 | 0.47 | 0 | 0.06 | 0.06 | 0.06 | 0.06 |
| Fumed silica(C) | Aerosil R202 | | 3 parts | 3 parts | 3 parts | | | | |
| | HDK H18 | | | | | | | | |
| | Aerosil R972 | | | | | | | | |
| | Aerosil 130 | | | | | | | | |
| | TS-720 | | | | | | | | |
| Crystalline silica | CRYSTALITE 5X | | | | | 3 parts | | | |
| Fused silica | FUSELEX E1 | | | | | | 3 parts | | |
| Colloidal calcium carbonate | HAKUENKA CCR | | | | | | | 3 parts | |
| Ground calcium carbonate | WHITON SB | | 15 parts | 15 parts | 15 parts | 15 parts | 15 parts | 15 parts | 15 parts |
| Calcium oxide(F) | CML #35 | | | | | | | | |
| | CML #31 | | 5 parts | 5 parts | 5 parts | 5 parts | 5 parts | 5 parts | 5 parts |
| Carbon black | MONARCH 280 | | 0.3 parts | 0.3 parts | 0.3 parts | 0.3 parts | 0.3 parts | 0.3 parts | 0.3 parts |
| Reactive diluent | Cardura E10P | | 10 parts | 10 parts | 10 parts | 10 parts | 10 parts | 10 parts | 10 parts |
| Epoxy curing agent(D) | dicyanamide | | 7 parts | 7 parts | 7 parts | 7 parts | 7 parts | 7 parts | 7 parts |
| Curing accelerator(E) | E-1 | | 2 parts | 2 parts | 2 parts | 2 parts | 2 parts | 2 parts | 2 parts |
| | Ancamine 2014FG | | | | | | | | |
| | Dyhard UR300 | | | | | | | | |
| Amount of (B) relative to 100 parts of (A) | | | — | — | — | 30 parts | 30 parts | 30 parts | 30 parts |
| Amount of (C) relative to 100 parts of (A) | | | 3 parts | 3 parts | 3 parts | — | — | — | — |
| Amount of (D) relative to 100 parts of (A) | | | 7 parts | 7 parts | 7 parts | 7 parts | 7 parts | 7 parts | 7 parts |
| Amount of (E) relative to 100 parts of (A) | | | 2 parts | 2 parts | 2 parts | 2 parts | 2 parts | 2 parts | 2 parts |
| Amount of (F) relative to 100 parts of (A) | | | 5 parts | 5 parts | 5 parts | 5 parts | 5 parts | 5 parts | 5 parts |
| Thixotropy | | | 1.3 | 1.3 | 1.3 | 1.0 | 1.0 | 1.1 | 1.0 |
| Storage stability | | | 138 | 142 | 127 | 107 | 105 | 110 | 103 |
| T peel adhesive strength (N/25 mm) | | | 156 | 157 | 162 | — | — | — | — |
| Dynamic resistance to cleavage (kN/m) | | | 22 | 20 | 19 | — | — | — | — |

Table 1 shows that curable resin compositions containing the components (A), (B) and (C) of the present invention are high in thixotropy, good in storage stability (small in viscosity change), and excellent in peel adhesion and impact and peel-resistant adhesion. The polymer fine particle (B) of the present invention means polymer fine particles satisfying a prescribed content of epoxy groups.

Examples 8 to 9, Comparative Examples 9 to 14

According to the recipe given in Table 2, an epoxy resin (A-1) as a component (A), a dispersion (A-1 to M-5, M-8 and M-9) obtained in the above-described Production Examples 3-1 to 3-5, 3-8 and 3-9, inorganic fillers, a reactive diluent, an epoxy curing agent as a component (D), and a curing accelerator as a component (E) were weighed and mixed well, and thus a curable resin composition was obtained, respectively.

In Table 2, Ancamine 2014FG (produced by Air Products and Chemicals, Inc., modified amine) was used as a curing accelerator.

<Storage Stability>

The viscosity of the curable resin composition at a shear rate of 2 s$^{-1}$ was measured before and after storing it for 14 days at 40° C. As storage stability, a value of "the viscosity at 2 s$^{-1}$ after storage with the viscosity at 2 s$^{-1}$ before storage being taken as 100" was measured. The larger this value, the poorer the storage stability. The test results are shown in Table 2.

<T-Peel Adhesion Strength>

A curable resin composition was applied to two SPCC steel plates having dimensions of 25 mm×200 mm×0.5 mm, the plates were stacked to have an adhesive layer thickness of 0.25 mm, followed by curing at 170° C. for 1 hour, and then T-peel adhesion strength at 23° C. was measured according to JIS K6854. The test results are shown in Table 2.

<Dynamic Resistance to Cleavage (Impact and Peel-Resistant Adhesion)>

A curable resin composition was applied to two SPCC steel plates, the plates were stacked to have an adhesive layer thickness of 0.25 mm, followed by curing at 170° C. for 1 hour, and then dynamic resistance to cleavage at 23° C. was measured according to ISO 11343. The test results are shown in Table 2.

storing it for 7 days at 60° C. Thixotropy was evaluated from "the viscosity at 2 $s^{-1}$ before storage/the viscosity at 10 $s^{-1}$ before storage." The larger this value, the better the thixotropy. As storage stability, a value of "the viscosity at 1 $s^{-1}$ after storage with the viscosity at 1 $s^{-1}$ before storage being taken as 100" was measured. The larger this value, the poorer the storage stability. The test results are shown in Table 3.

TABLE 2

| Composition (part(s) by mass or % by mass) | | | Example 8 | Example 9 | Comparative Example 9 | Comparative Example 10 | Comparative Example 11 | Comparative Example 12 | Comparative Example 13 | Comparative Example 14 |
|---|---|---|---|---|---|---|---|---|---|---|
| Epoxy resin (A) | Bisphenol A epoxy resin | A-1 (JER828EL) | 40 parts | 40 parts | 100 parts | 40 parts | 40 parts | 40 parts | 40 parts | 40 parts |
| | Rubber-modified epoxy resin | EPON58005 | | | | | | | | |
| | Rubber-modified epoxy resin | EPON58006 | | | | | | | | |
| | Urethane-modified epoxy resin | EPU-73B | | | | | | | | |
| Dispersion of polymer fine particle (M) | Kind of dispersion (M) (compounded amount) | | M-1 (90 parts) | M-2 (90 parts) | | M-3 (90 parts) | M-4 (90 parts) | M-5 (90 parts) | M-8 (90 parts) | M-9 (90 parts) |
| | Amount of polymer fine particle (B) | | 30 parts | 30 parts | | 30 parts | 30 parts | 30 parts | 30 parts | 30 parts |
| | Amount of epoxy resin A-1 | | 60 parts | 60 parts | | 60 parts | 60 parts | 60 parts | 60 parts | 60 parts |
| Amount of epoxy group of polymer fine particle (mmol/g) | | | 0.06 | 0.12 | | 0.23 | 0.47 | 0 | 0.07 | 0.07 |
| Fumed silica (C) | Aerosil R202 | | 3 parts | 3 parts | 3 parts | 3 parts | 3 parts | 3 parts | 3 parts | 3 parts |
| | HDK H18 | | | | | | | | | |
| | Aerosil R972 | | | | | | | | | |
| | Aerosil 130 | | | | | | | | | |
| | TS-720 | | | | | | | | | |
| Crystalline silica | CRYSTALITE 5X | | | | | | | | | |
| Fused silica | FUSELEX E1 | | | | | | | | | |
| Colloidal calcium carbonate | HAKUENKA CCR | | | | | | | | | |
| Ground calcium carbonate | WHITON SB | | 15 parts | 15 parts | 15 parts | 15 parts | 15 parts | 15 parts | 15 parts | 15 parts |
| Calcium oxide (F) | CML #35 | | | | | | | | | |
| | CML #31 | | 5 parts | 5 parts | 5 parts | 5 parts | 5 parts | 5 parts | 5 parts | 5 parts |
| Carbon black | MONARCH 280 | | 0.3 parts | 0.3 parts | 0.3 parts | 0.3 parts | 0.3 parts | 0.3 parts | 0.3 parts | 0.3 parts |
| Reactive diluent | Cardura E10P | | 10 parts | 10 parts | 10 parts | 10 parts | 10 parts | 10 parts | 10 parts | 10 parts |
| Epoxy curing agent (D) | dicyanamide | | 7 parts | 7 parts | 7 parts | 7 parts | 7 parts | 7 parts | 7 parts | 7 parts |
| Curing accelerator (E) | E-1 | | | | | | | | | |
| | Ancamine 2014FG | | 1 part | 1 part | 1 part | 1 part | 1 part | 1 part | 1 part | 1 part |
| | Dyhard UR300 | | | | | | | | | |
| Amount of (B) relative to 100 parts of (A) | | | 30 parts | 30 parts | 30 parts | — | — | — | — | — |
| Amount of (C) relative to 100 parts of (A) | | | 3 parts | 3 parts | 3 parts | 3 parts | 3 parts | 3 parts | 3 parts | 3 parts |
| Amount of (D) relative to 100 parts of (A) | | | 7 parts | 7 parts | 7 parts | 7 parts | 7 parts | 7 parts | 7 parts | 7 parts |
| Amount of (E) relative to 100 parts of (A) | | | 1 part | 1 part | 1 part | 1 part | 1 part | 1 part | 1 part | 1 part |
| Amount of (F) relative to 100 parts of (A) | | | 5 parts | 5 parts | 5 parts | 5 parts | 5 parts | 5 parts | 5 parts | 5 parts |
| Storage stability | | | 111 | 108 | 104 | 122 | 125 | 115 | 109 | 130 |
| T peel adhesive strength (N/25 mm) | | | 170 | 155 | 8 | 141 | 139 | 166 | 154 | 151 |
| Dynamic resistance to cleavage (kN/m) | | | 23 | 24 | 0 | 21 | 16 | 18 | 3 | 1 |

Table 2 shows that curable resin compositions containing the components (A), (B) and (C) of the present invention are good in storage stability (small in viscosity change) and excellent in peel adhesion, and impact and peel-resistant adhesion.

Examples 10 to 17, Comparative Examples 15 to 18

According to the recipe shown in Table 3, ingredients were weighed and mixed well, and thus a curable resin composition was obtained, respectively.

<Thixotropy and Storage Stability>

The viscosity of the curable resin composition at shear rates of 1 $s^{-1}$, 2 $s^{-1}$ and 10 $s^{-1}$ was measured before and after Additionally, the following components were used as compounding agents other than the above-described agents.

<Epoxy Resin (A)>

EPON Resin 58005 (produced by Momentive Specialty Chemicals Inc., rubber-modified epoxy resin, elastomer concentration: 40% by mass, bisphenol A-type epoxy resin concentration: 60% by mass, epoxy equivalent weight: 325 to 375)

EPON Resin 58006 (produced by Momentive Specialty Chemicals Inc., rubber-modified epoxy resin, elastomer concentration: 40% by mass, bisphenol. A-type epoxy resin concentration: 60% by mass, epoxy equivalent weight: 330 to 360)

TABLE 3

| Composition (part(s) by mass or % by mass) | | | Example 10 | Example 11 | Example 12 | Example 13 | Example 14 | Example 15 | Example 16 |
|---|---|---|---|---|---|---|---|---|---|
| Epoxy resin (A) | Bisphenol A epoxy resin | A-1 (JER828EL) | 37.5 parts | 12.5 parts | 25 parts | 37.5 parts | 50 parts | 37.5 parts | 37.5 parts |
| | Rubber-modified epoxy resin | EPON58005 | | | | | | | |
| | Rubber-modified epoxy resin | EPON58006 | | | | | | | |
| | Urethane-modified epoxy resin | EPU-73B | | | | | | | |
| Dispersion of polymer fine particle (M) | Kind of dispersion (M) (compounded amount) | | M-1 (45 parts) | M-2 (75 parts) | M-2 (60 parts) | M-2 (45 parts) | M-2 (30 parts) | M-6 (45 parts) | M-7 (45 parts) |
| | Amount of polymer fine particle (B) | | 15 parts | 25 parts | 20 parts | 15 parts | 10 parts | 15 parts | 15 parts |
| | Amount of epoxy resin A-1 | | 30 parts | 50 parts | 40 parts | 30 parts | 20 parts | 30 parts | 30 parts |
| Amount of epoxy group of polymer fine particle (mmol/g) | | | 0.06 | 0.12 | 0.12 | 0.12 | 0.12 | 0.14 | 0.07 |
| Amount of (B) relative to 100 parts of (A) | | | 22 parts | 40 parts | 31 parts | 22 parts | 14 parts | 22 parts | 22 parts |
| Thixotropy | | | 2.1 | 2.1 | 2.5 | 2.2 | 1.9 | 2.6 | 1.8 |
| Storage stability | | | 136 | 114 | 116 | 156 | 212 | 192 | 150 |

| Composition (part(s) by mass or % by mass) | | | Example 17 | Comparative Example 15 | Comparative Example 16 | Comparative Example 17 | Comparative Example 18 |
|---|---|---|---|---|---|---|---|
| Epoxy resin (A) | Bisphenol A epoxy resin | A-1 (JER828EL) | | 22.5 parts | | | |
| | Rubber-modified epoxy resin | EPON58005 | | | 70 parts | 37.5 parts | 37.5 parts |
| | Rubber-modified epoxy resin | EPON58006 | 37.5 parts | | | | |
| | Urethane-modified epoxy resin | EPU-73B | | | | | |
| Dispersion of polymer fine particle (M) | Kind of dispersion (M) (compounded amount) | | M-2 (45 parts) | M-2 (45 parts) | | M-3 (45 parts) | M-4 (45 parts) |
| | Amount of polymer fine particle (B) | | 15 parts | 15 parts | | 15 parts | 15 parts |
| | Amount of epoxy resin A-1 | | 30 parts | 30 parts | | 30 parts | 30 parts |
| Amount of epoxy group of polymer fine particle (mmol/g) | | | 0.12 | 0.12 | | 0.23 | 0.47 |
| Amount of (B) relative to 100 parts of (A) | | | 22 parts | 29 parts | — | — | — |
| Thixotropy | | | 2.3 | 1.2 | 1.0 | 2.2 | 2.4 |
| Storage stability | | | 130 | 110 | 105 | 277 | 385 |

Table 3 shows that curable resin compositions containing a bisphenol A-type epoxy resin and a rubber-modified epoxy resin as the component (A) of the present invention and also containing the polymer fine particle (B) of the present invention are high in thixotropy and good in storage stability (small in viscosity change). The bisphenol. A-type epoxy resin of the component (A) of Examples 10 to 17 includes both the component contained in the dispersion (M) of polymer fine particles and the component added as the epoxy resin.

Examples 18 to 20, Comparative Examples 19 to 22

According to the recipe shown in Table 4, ingredients were weighed and mixed well, and thus a curable resin composition was obtained, respectively. T peel adhesion strength and dynamic resistance to cleavage were measured by using each of the curable resin composition of Table 4. The results are shown in Table 4.

<T-Peel Adhesion Strength>

A curable resin composition was applied to two SPCC steel plates having dimensions of 25 mm×200 mm×0.5 mm and the plates were stacked to have an adhesive layer thickness of 0.25 mm, followed by curing at 170° C. for 1 hour, and then T-peel adhesion strength at 23° C. was measured according to 315 K6854. The test results are shown in Table 4. The specimen after the T-peel adhesion strength had been measured was observed and the fractured part was evaluated whether it was broken at the interface between an SPCC steel plate and a cured resin (interfacial failure) or it was broken in the cured resin (aggregation failure). When interfacial failure was observed entirely, this was expressed by "interfacial failure" in Table 4. When both interfacial failure and aggregation failure were observed in combination, this was expressed by "partial aggregation failure" in Table 4.

<Dynamic Resistance to Cleavage (Impact and Peel-Resistant Adhesion)>

A curable resin composition was applied to two SPCC steel plates, the plates were stacked to have an adhesive layer thickness of 0.25 mm, followed by curing at 170° C. for 1 hour, and then dynamic resistance to cleavage at 23° C. was measured according to ISO 11343. The test results are shown in Table 4.

Additionally, the following components were used as compounding agents other than the above-described agents.
<Inorganic Filler>
<<Fumed Silica>>
CAB-O-SIL TS-720 (produced by Cabot Corporation, fumed silica surface-treated with polydimethylsiloxane)
<<Calcium Oxide (F)>>
CML#35 (produced by Ohmi Chemical Industry Co., Ltd., surface-untreated calcium oxide)
<Curing Accelerator (E)>
Dyhard UR300 (produced by AlzChem AG, 1,1-dimethyl-3-phenylurea)

Examples 21 to 22, Comparative Examples 23 to 26

According to the recipe shown in Table 5, ingredients were weighed and mixed well, and thus a curable resin composition was obtained, respectively.
<Thixotropy and Storage Stability>
The viscosity of the curable resin composition at shear rates of 1 $s^{-1}$, 2 $s^{-1}$ and 5 $s^{-1}$ was measured before and after storing it for 7 days at 60° C. Thixotropy was evaluated from "the viscosity at 1 $s^{-1}$ before storage/the viscosity at 5 $s^{-1}$ before storage." The larger this value, the better the thixot-

TABLE 4

| Composition (part(s) by mass or % by mass) | | Example | | | Comparative Example | | | |
|---|---|---|---|---|---|---|---|---|
| | | 18 | 19 | 20 | 19 | 20 | 21 | 22 |
| Epoxy resin (A) | Bisphenol A epoxy resin A-1 (JER828EL) | 47.5 parts | 47.5 parts | 47.5 parts | 40 parts | 47.5 parts | 47.5 parts | 47.5 parts |
| | Rubber-modified epoxy resin EPON58005 | 37.5 parts | 37.5 parts | 37.5 parts | | 37.5 parts | 37.5 parts | 37.5 parts |
| | Rubber-modified epoxy resin EPON58006 | | | | | | | |
| | Urethane-modified epoxy resin EPU-73B | | | | | | | |
| Dispersion of polymer fine particle (M) | Kind of dispersion (M) (compounded amount) | M-2 (45 parts) | M-2 (45 parts) | M-2 (45 parts) | M-2 (90 parts) | M-3 (45 parts) | M-4 (45 parts) | M-5 (45 parts) |
| | Amount of polymer fine particle (B) | 15 parts | 15 parts | 15 parts | 30 parts | 15 parts | 15 parts | 15 parts |
| | Amount of epoxy resin A-1 | 30 parts | 30 parts | 30 parts | 60 parts | 30 parts | 30 parts | 30 parts |
| Amount of epoxy group of polymer fine particle (mmol/g) | | 0.12 | 0.12 | 0.12 | 0.12 | 0.23 | 0.47 | 0 |
| Fumed silica(C) | Aerosil R202 | | | | | | | |
| | HDK H18 | | | | | | | |
| | Aerosil R972 | | | | | | | |
| | Aerosil 130 | | | | | | | |
| | TS-720 | | | 3 parts | | | | |
| Ground calcium carbonate | WHITON SB | 15 parts | 15 parts | 15 parts | 15 parts | 15 parts | 15 parts | 15 parts |
| Calcium oxide(F) | CML #35 | 5 parts | | | | | | |
| | CML #31 | | 5 parts | 5 parts | 5 parts | 5 parts | 5 parts | 5 parts |
| Carbon black | MONARCH 280 | 0.3 parts | 0.3 parts | 0.3 parts | 0.3 parts | 0.3 parts | 0.3 parts | 0.3 parts |
| Reactive diluent | Cardura E10P | 10 parts | 10 parts | 10 parts | 10 parts | 10 parts | 10 parts | 10 parts |
| Epoxy curing agent(D) | dicyanamide | 7 parts | 7 parts | 7 parts | 7 parts | 7 parts | 7 parts | 7 parts |
| Curing accelerator (E) | E-1 | | | | | | | |
| | Ancamine 2014FG | | | | | | | |
| | Dyhard UR300 | 1 part | 1 part | 1 part | 1 part | 1 part | 1 part | 1 part |
| Amount of (B) relative to 100 parts of (A) | | 13 parts | 13 parts | 13 parts | 30 parts | — | — | — |
| Amount of (C) relative to 100 parts of (A) | | — | — | 2.6 parts | — | — | — | — |
| Amount of (D) relative to 100 parts of (A) | | 6.1 parts | 6.1 parts | 6.1 parts | 7.0 parts | 6.1 parts | 6.1 parts | 6.1 parts |
| Amount of (E) relative to 100 parts of (A) | | 0.9 parts | 0.9 parts | 0.9 parts | 1.0 part | 0.9 parts | 0.9 parts | 0.9 parts |
| Amount of (F) relative to 100 parts of (A) | | 4.3 parts | 4.3 parts | 4.3 parts | 5.0 parts | 4.3 parts | 4.3 parts | 4.3 parts |
| T peel adhesive strength (N/25 mm) | | 206 | 236 | 240 | 184 | 231 | 227 | 273 |
| Broken state of specimens after T peel adhesive test | | partial aggregation failure | partial aggregation failure | partial aggregation failure | interfacial failure | partial aggregation failure | partial aggregation failure | partial aggregation failure |
| Dynamic resistance to cleavage (kN/m) | | 28 | 30 | 30 | 32 | 26 | 25 | 17 |

Table 4 shows that curable resin compositions containing a bisphenol A-type epoxy resin and a rubber-modified epoxy resin as the component (A) of the present invention and also containing the polymer fine particle (B) of the present invention are excellent in peel adhesion and impact and peel-resistant adhesion. The bisphenol A-type epoxy resin of the component (A) of Examples 18 to 20 includes both the component contained in the dispersion (M) of polymer fine particles and the component added as the epoxy resin (A).

ropy. As storage stability, a value of "the viscosity at 2 $s^{-1}$ after storage with the viscosity at 2 $s^{-1}$ before storage being taken as 100" was measured. The larger this value, the poorer the storage stability. The test results are shown in Table 5.

Additionally, the following components were used as compounding agents other than the above-described agents.
<Epoxy Resin (A)>
ADEKA RESIN EPU-73B (produced by ADEKA CORPORATION, urethane-modified epoxy resin, elastomer concentration: 30 to 40% by mass, bisphenol A-type epoxy resin concentration: 60 to 70% by mass, epoxy equivalent weight: 245)

TABLE 5

| Composition (part(s) by mass or % by mass) | | | Example | | Comparative Example | | | |
|---|---|---|---|---|---|---|---|---|
| | | | 21 | 22 | 23 | 24 | 25 | 26 |
| Epoxy resin (A) | Bisphenol A epoxy resin | A-1 (JER828EL) | | | 25 parts | | | |
| | Rubber-modified epoxy resin | EPON58005 | | | | | | |
| | Rubber-modified epoxy resin | EPON58006 | | | | | | |
| | Urethane-modified epoxy resin | EPU-73B | 25 parts | 25 parts | | 25 parts | 25 parts | 25 parts |
| Dispersion of polymer fine particle(M) | Kind of dispersion (M) (compounded amount) | | M-1 (60 parts) | M-2 (60 parts) | M-1 (60 parts) | | M-4 (60 parts) | M-5 (60 parts) |
| | Amount of polymer fine particle (B) | | 20 parts | 20 parts | 20 parts | | 20 parts | 20 parts |
| | Amount of epoxy resin A-1 | | 40 parts | 40 parts | 40 parts | | 40 parts | 40 parts |
| Amount of epoxy group of polymer fine particle (mmol/g) | | | 0.06 | 0.12 | 0.06 | — | 0.47 | 0 |
| Amount of (B) relative to 100 parts of (A) | | | 31 parts | 31 parts | 31 parts | — | — | — |
| Thixotropy | | | 1.2 | 1.2 | 1.1 | 1.0 | 1.2 | 1.2 |
| Storage stability | | | 121 | 121 | 110 | 102 | 128 | 129 |

Table 5 shows that curable resin compositions containing a bisphenol A epoxy resin and a urethane-modified epoxy resin as the component (A) of the present invention and also containing the polymer fine particle (B) of the present invention are high in thixotropy and good in storage stability (small in viscosity change). The bisphenol A-type epoxy resin of the component (A) of Examples 21 to 22 includes both the component contained in the dispersion (M) of polymer fine particles and the component added as the epoxy resin.

Examples 23 to 24, Comparative Examples 27 to 28

According to the recipe shown in Table 6, ingredients were weighed and mixed well, and thus a curable resin composition was obtained, respectively.

The dynamic resistance to cleavage was measured by using each of the curable resin compositions of Table 6. The results are shown in Table 6.

<Dynamic Resistance to Cleavage (Impact and Peel-Resistant Adhesion)>

A curable resin composition was applied to two SPCC steel plates, the plates were stacked to have an adhesive layer thickness of 0.25 mm, followed by curing at 170° C. for 1 hour, and then dynamic resistance to cleavage at 23° C. was measured according to ISO 11343. The test results are shown in Table 6.

Additionally, the following components were used as compounding agents other than the above-described agents.

<Reactive Diluent>

YED216 (produced by Mitsubishi Chemical Corporation, 1,6-hexanediol diglycidyl ether)

TABLE 6

| Composition (part(s) by mass or % by mass) | | | Example | | Comparative Example | |
|---|---|---|---|---|---|---|
| | | | 23 | 24 | 27 | 28 |
| Epoxy resin (A) | Bisphenol A epoxy resin | A-1 (JER828EL) | 55 parts | 55 parts | 55 parts | 55 parts |
| | Rubber-modified epoxy resin | EPON58005 | | | | |
| | Rubber-modified epoxy resin | EPON58006 | | | | |
| | Urethane-modified epoxy resin | EPU-73B | 25 parts | 25 parts | 25 parts | 25 parts |
| | 1,6-hexanediol diglycidyl ether | YED216 | 5 parts | 5 parts | 5 parts | 5 parts |
| Dispersion of polymer fine particle (M) | Kind of dispersion M (compounded amount) | | M-1 (60 parts) | M-2 (60 parts) | M-4 (60 parts) | M-5 (60 parts) |
| | Amount of polymer fine particle (B) | | 20 parts | 20 parts | 20 parts | 20 parts |
| | Amount of epoxy resin A-1 | | 40 parts | 40 parts | 40 parts | 40 parts |
| Amount of epoxy group of polymer fine particle (mmol/g) | | | 0.06 | 0.12 | 0.47 | 0 |
| Ground calcium carbonate | WHITON SB CML #35 | | 15 parts | 15 parts | 15 parts | 15 parts |
| Calcium oxide(F) | CML #31 | | 1.5 parts | 1.5 parts | 1.5 parts | 1.5 parts |
| Carbon black | MONARCH 280 | | 0.3 parts | 0.3 parts | 0.3 parts | 0.3 parts |
| Reactive diluent | Cardura E10P | | | | | |
| Epoxy curing agent(D) | Dicyanamide | | 7 parts | 7 parts | 7 parts | 7 parts |
| Curing accelerator(E) | E-1 Ancamine 2014FG | | | | | |
| | Dyhard UR300 | | 1 part | 1 part | 1 part | 1 part |
| Amount of (B) relative to 100 parts of (A) | | | 16 parts | 16 parts | — | — |
| Amount of (C) relative to 100 parts of (A) | | | — | — | — | — |
| Amount of (D) relative to 100 parts of (A) | | | 5.6 parts | 5.6 parts | 5.6 parts | 5.6 parts |
| Amount of (E) relative to 100 parts of (A) | | | 0.8 parts | 0.8 parts | 0.8 parts | 0.8 parts |
| Amount of (F) relative to 100 parts of (A) | | | 1.2 parts | 1.2 parts | 1.2 parts | 1.2 parts |
| Dynamic resistance to cleavage (kN/m) | | | 9 | 11 | 6 | 6 |

Table 6 shows that curable resin compositions containing a bisphenol A-type epoxy resin and a urethane-modified epoxy resin as the component (A) of the present invention and also containing the polymer fine particle (B) of the present invention are excellent in impact and peel-resistant adhesion. The bisphenol A-type epoxy resin of the component (A) of Examples 23 and 24 includes both the component contained in the dispersion (M) of polymer fine particles and the component added as the epoxy resin (A).

INDUSTRIAL APPLICABILITY

The curable resin composition according to the present invention can be used suitably as a structural adhesive for vehicle and aerospace structures, an adhesive for wind power generating structures, a paint, a laminate material using glass fiber, a material for printed wiring substrates, a solder resist, an interlayer insulating film, a build-up material, an adhesive for FPCs, an electrically insulating material including a sealing material for electronic components such as semiconductors and LEDs, a die bonding material, an underfill, a semiconductor packaging material for ACF, ACP, NCF, NCP and the like, a sealing material such as a sealing material for display devices and lighting devices including a liquid crystal panel, an OLED lighting devices and an OLED display.

The invention claimed is:

1. A curable resin composition (I) comprising:
an epoxy resin (A),
from 1 to 100 parts by mass of a polymer fine particle (B) relative to 100 parts by mass of the epoxy resin (A),
from 0.5 to 300 parts by mass of an inorganic filler (C) relative to 100 parts by mass of the epoxy resin (A),
wherein
the polymer fine particle has a core-shell structure,
a core layer of the polymer fine particle is diene rubber,
a shell layer of the polymer fine particle is a polymer polymerized with one or more monomers having an epoxy group,
a content of the epoxy group of the polymer fine particle (B) is from 0.01 to 0.2 mmol/g, and
the inorganic filler is fumed silica.

2. A curable resin composition (II) comprising:
an epoxy resin (A) and
from 1 to 100 parts by mass of a polymer fine particle (B) relative to 100 parts by mass of the epoxy resin (A),
wherein
the polymer fine particle has a core-shell structure,
a core layer of the polymer fine particle is diene rubber,
a shell layer of the polymer fine particle is a polymer polymerized with one or more monomers having an epoxy group,
a content of the epoxy group of the polymer fine particle (B) is from 0.01 to 0.2 mmol/g,
the epoxy resin (A) comprises at least one resin selected from the group consisting of a bisphenol A epoxy resin, rubber-modified epoxy resin, and urethane-modified epoxy resin.

3. The curable resin composition (II) according to claim 2, further comprising from 0.5 to 30 parts by mass of fumed silica as an inorganic filler (C) relative to 100 parts by mass of the epoxy resin (A).

4. The curable resin composition according to claim 1, wherein the curable resin composition (I) is an one-pack composition.

5. The curable resin composition according to claim 1, further comprising from 1 to 80 parts by mass of an epoxy curing agent (D) relative to 100 parts by mass of the epoxy resin (A).

6. The curable resin composition according to claim 1, further comprising from 0.1 to 10 parts by mass of a curing accelerator (E) relative to 100 parts by mass of the epoxy resin (A).

7. The curable resin composition according to claim 1, further comprising from 0.1 to 10 parts by mass of calcium oxide (F) relative to 100 parts by mass of the epoxy resin (A).

8. The curable resin composition according to claim wherein the diene rubber is a butadiene rubber, butadiene-styrene rubber, or a combination thereof.

9. The curable resin composition according to claim 1, wherein the shell layer is graft-polymerized on the core layer, and the shell layer is polymerized with one or more monomers selected from the group consisting of an aromatic vinyl monomer, a vinyl cyanide monomer, and a (meth)acrylate monomer.

10. The curable resin composition according to claim 1, wherein the shell layer is graft-polymerized on the core layer.

11. The curable resin composition according to claim 10, wherein the monomer having an epoxy group is glycidyl methacrylate.

12. The curable resin composition according to claim 1, wherein the polymer fine particle is dispersed at the state of primary particle in the curable resin composition (I).

13. The curable resin composition according to claim 2, wherein the epoxy resin (A) comprises the rubber-modified epoxy resin which is an acrylonitrile-butadiene modified epoxy resin.

14. A cured product of the curable resin composition (I) according to claim 1.

15. A structural adhesive comprising the curable resin composition (I) according to claim 1.

16. A structural adhesive for a vehicle, wherein the structural adhesive comprises the curable resin composition (I) according to claim 1.

17. The curable resin composition according to claim 2, wherein the shell layer is graft-polymerized on the core layer, and the shell layer is polymerized with one or more monomers selected from the group consisting of an aromatic vinyl monomer, a vinyl cyanide monomer, and a (meth)acrylate monomer.

18. The curable resin composition according to claim 2, wherein the shell layer is graft-polymerized on the core layer.

19. The curable resin composition according to claim 18, wherein the monomer having an epoxy group is glycidyl methacrylate.

20. The curable resin composition according to claim 2, wherein the polymer fine particle is dispersed at the state of primary particle in the curable resin composition (II).

* * * * *